United States Patent [19]

Ott et al.

[11] 4,368,469

[45] Jan. 11, 1983

[54] TRAVELING WAVE INTERFEROMETRY PARTICULARLY FOR SOLAR POWER SATELLITES

[75] Inventors: James H. Ott; James S. Rice, both of Akron, Ohio

[73] Assignee: Novar Electronics Corporation, Barberton, Ohio

[21] Appl. No.: 75,943

[22] Filed: Sep. 17, 1979

[51] Int. Cl.³ .............................................. H04B 7/00
[52] U.S. Cl. ........................ 343/100 ST; 343/100 SA
[58] Field of Search .................. 343/100 SA, 100 ST, 343/854

[56] References Cited

U.S. PATENT DOCUMENTS

| | | | |
|---|---|---|---|
| 3,346,861 | 10/1967 | Chadwick et al. | 343/854 |
| 3,942,177 | 3/1976 | Danzer et al. | 343/100 TD |
| 4,187,506 | 2/1980 | Dickinson | 343/100 ST |
| 4,213,131 | 7/1980 | Kaiser, Jr. | 343/100 SA |

Primary Examiner—Theodore M. Blum
Attorney, Agent, or Firm—Frank H. Foster

[57] ABSTRACT

A method and apparatus for use in scientific measurement analysis and control. Travelling interference fringes are generated by radiating at least two different periodic waves at two different frequencies, one from each of two different radiators. The waves are received, mixed and filtered to detect at least one beat signal from these waves which represents the travelling interference fringe. The phase of that beat signal is detected relative to a reference signal of the same frequency as the beat signal. The radiated waves may be received at a second antenna and the phase of the beat of the waves at the first antenna is compared to the phase of the beat as observed at the second antenna. A third wave may be radiated from the first antenna to provide a reference signal which is the beat generated by the third wave and the other wave from the same radiator.

44 Claims, 9 Drawing Figures

FIG. 1
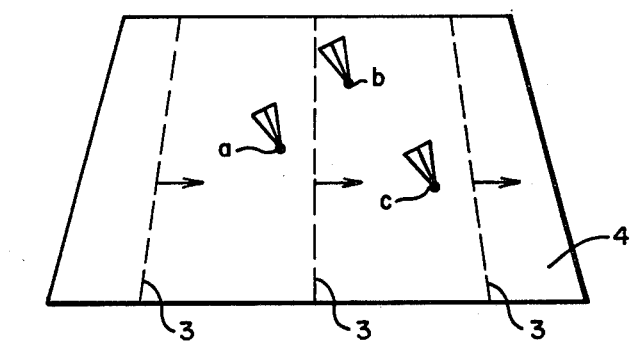
FIG. 2
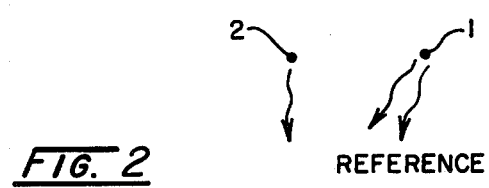
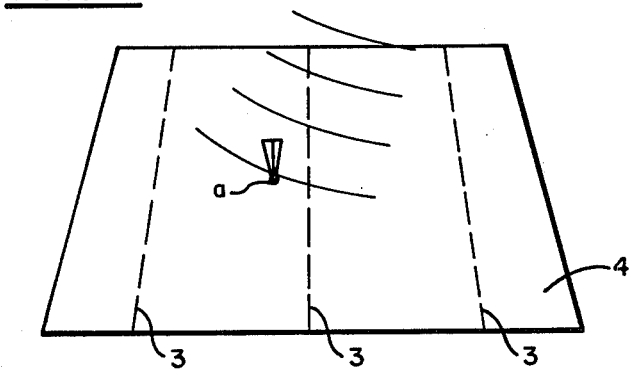

FLOWCHART FOR PHASE TUNING PROGRAM

TRAVELING WAVE INTERFEROMETRY PARTICULARLY FOR SOLAR POWER SATELLITES

TECHNICAL FIELD

This invention relates to a fundamental new scientific measuring and controlling technique which we have termed Travelling Wave Interferometry. It relates to the radiation of periodic waves to generate interference fringes which travel across a surface and to the making of measurements using phase comparison techniques to measure these travelling interference fringes. The invention also relates to methods and apparatus for using these measurements. One particular embodiment of the present invention relates to the forming and pointing of an electromagnetic beam from an array of radiating antennas which are located on a solar power satellite so that the beam energy may be efficiently received at an array of receiving antennas on earth.

BACKGROUND ART

A variety of sophisticated, measuring systems have been developed in the prior art. For example, time domain reflection techniques have been applied to radar and sonar. Light wave interferometry has also been used for such things as measuring the wave length of light and measuring the density differences at various points in a supersonic wind tunnel. Standing interference fringes have also been described involving sound waves or the vibration of a physical mass.

These techniques, however, involve standing interference fringes. That is, the interference fringes are in a fixed spatial position determined by the frequency and phase of the radiated waves and the positioning of the radiators relative to each other and relative to the surface upon which the interference fringes are observed.

One particular application of travelling wave interferometry techniques is in a solar power satellite system. Such a system has a large number of solar power transducers, which convert solar light energy to electrical energy, mounted on the solar power satellite. These solar power transducers are connected to microwave oscillator circuits which in turn are connected to radiating antennas mounted on the solar power satellite. The solar power satellite has a plurality of antennas arranged in a suitable antenna array, each antenna or subarray radiating a portion of the total power. In this manner solar energy can be converted to microwave electrical energy and radiated as electromagnetic waves to earth as a composite beam.

On earth an antenna field comprising an array of receiving antennas will receive the microwave energy. The energy of the microwave beam is then converted to useful DC and/or another electrical energy form.

In order to have efficient coupling of energy from the solar power satellite to earth, it is desirable that the waves radiated from each separate radiating antenna or radiator of the space antenna impinge upon the receiving antenna array as nearly in phase as possible. By arriving in phase they will, at the receiving antenna field, produce the reinforcing effect of constructive interference also termed constructive reinforcement rather than the cancelling effect of destructive interference. It is therefore desirable that the waves from all the individual antennas on the space antenna arrive at the receiving antenna on earth in the form of a planar wave front.

It is desirable, but not necessary, to form the planar wave front about a reference antenna on earth which is located at the center of the receiving antenna array.

In order to create such a planar wave front, the phase of the wave radiated from each space antenna or subarray must be properly phased so that all waves arrive in phase. Phase corrections for each radiating space antenna are therefore necessary to correct the phasing of the wave from each antenna. The phase corrections electrically point or steer the radiated beam and also compensate for phase variations within the electrical circuitry of the solar power satellite as well as variations in the physical positioning of the individual antennas in the antenna array of the solar power satellite.

One suggestion for compensating the phase of each antenna is that a pilot signal be transmitted from the receiving antenna site on earth. The pilot signal would be received by retrodirective arrays on the solar powered satellite which phase conjugate the pilot signal so that the net phase shift of the transmitted signal from each individual antenna as observed in the plane of the power beam wave front is zero. However, it is believed that ionospheric effects preclude the use of a pilot beam from earth for accurate phase compensation.

It is therefore desirable and an object of the invention to phase compensate the space antenna with a system which is not subject to those effects and which has a considerably wider scope of useful application.

DISCLOSURE OF THE INVENTION

Standing interference fringes have been generated in the past by radiating waves having the same frequency from two or more spaced apart sources. In the present invention the interference fringes are made to move or travel so that their spacing, position and/or relative phase may be measured by receivers or transducers at one or more fixed locations.

Data relating to the distance between the fringes and the position of the fringes at a selected instant of time may be detected by using phase comparison techniques in accordance with the present invention.

The basic concept is illustrated in FIGS. 1 and 2. The concept applies to various types of waves including electromagnetic and mass vibration waves. Referring to FIGS. 1 and 2, if two different periodic waves, such as sinusoidally varying waves, are radiated from points 1 and 2 at the same frequency, a plurality of standing interference fringes 3 will form on any given surface which is spaced from points 1 and 2. If the two radiated waves have the same frequency, if they are in phase at the points 1 and 2 and if the points 1 and 2 lie along a line which is parallel to the planar surface 4, then the interference fringes will be centered upon the intersection of the plane 4 and a plane which bisects and is perpendicular to a line which joins points 1 and 2. Any changes in the relative phase between the waves radiated from points 1 and 2 and any changes in the spacing between points 1 and 2 will cause changes in the positioning of the interference fringes and/or the distance between interference fringes 3. Therefore, the distance between and the positioning of the interference fringes is a sensitive function of the positioning of the points 1 and 2 and of the phase of the waves radiated from the points 1 and 2.

In accordance with the present invention the waves radiated from the points 1 and 2 are radiated at different frequencies with the result that the interference fringes 3 travel across the plane 4. If, for example, the frequencies were different by 1 Hz, then the waves travelling across plane 4 would be in the position illustrated once each second. The interference fringes would travel with a one second cycle time corresponding to the difference in frequency between the waves radiated at the points 1 and 2. This difference is the beat frequency of the two waves.

The interference fringes travel because the simultaneous radiation of two waves at different frequencies is in effect the radiation of two waves the relative phase of which changes in a periodically repetitive manner at a rate equal to the frequency difference or beat between the waves radiated at point 1 and at point 2.

The position of, the distance between or the relative phase of these travelling interference fringes may be measured by receiving them at a receiving antenna or antennas which are positioned at fixed locations in the plane 4. Therefore, by causing the fringes to travel across the surface 4 there is no need to have either a moveable antenna or an extremely large number of antennas at many positions.

The interference pattern is itself actually a wave because an interference pattern is not merely a pattern of discrete lines but rather a continuously increasing and decreasing pattern of areas of constructive and destructive interference. With radiated sinusoidal waves, the interference pattern will also vary sinusoidally from maximums to minimums. Conventionally the term "fringe" is used to denote regions of maximum or minimum, usually a minimum. That term is similarly used in this patent to facilitate conceptualization of the phenomena being described. When a fringe travels it does so because the entire wave pattern travels and therefore the creation of a travelling interference fringe is the same as the creation of a travelling interference wave.

The distance between the travelling interference fringes 3 is a sensitive function of the distance between the electrical centers of the points 1 and 2. In order to obtain signals which are related to the distance between the fringes 3, at least two receiving antennas are needed which are spaced a known distance apart. Only two receiving antennas are necessary where the fringes travel parallel to a line connecting the two antennas. However, for a generalized case where the direction of travel is not parallel, a third antenna is required. Thus, FIG. 1 shows receiving antennas a, b and c which are not colinear, i.e., do not lie along the same line.

Using conventional geometry, the distance between interference fringes 3 may be found by comparing the phase of the travelling wave at receiving antenna a with its phase at antenna b and also with its phase at antenna c at a selected instant of time. At each receiving antenna position, the travelling wave is represented by the beat of the waves from points 1 and 2 as received at each particular point a, b and c.

Referring now to FIG. 2, signals relating to the position of the interference fringe may be obtained using only a single receiving antenna, a, if a third wave is simultaneously radiated from one of the same two points. For example, the third wave may be radiated from the point 1. This means that two waves are radiated from point 1 and one wave is radiated from point 2, all at different frequencies. Point 1, positioned for example at the center of a space antenna, may be defined as a reference point and the two waves radiated from it defined to be reference waves. The wave radiated from point 2 together with one of the reference waves radiated from point 1 will generate the travelling interference wave 3 in the plane 4. However, the two reference waves radiated from the point 1 will be radiated with concentric spherical wave fronts and therefore will not create a travelling interference wave.

The two reference waves from point 1 will have a beat frequency. This beat frequency of the two reference waves radiated from point 1 provides a convenient reference signal relative to which the phase of the travelling interference wave may be measured.

If the frequencies are selected so that the travelling wave and the beat of the two reference waves are at the same frequency, then a signal relating to the position of the closest null or minimum of the travelling interference wave at a selected instant of time can be determined if desired. More importantly, the phase of the travelling interference wave relative to the beat of the two reference waves may be measured.

Therefore, in its fundamental form the invention is a system for generating travelling interference fringes or waves by radiating at least two different periodic waves at two different frequencies, one from each of two different radiators. The radiated waves are received, mixed and filtered to detect at least one beat signal which represents the travelling interference wave. The filtering includes conventional bandpass filters for tuning a narrow pass band to selectively receive the radiated waves and for filtering out the unwanted frequencies after mixing. Usually the difference beat frequency is used and the sum frequency and harmonics are rejected. The phase of that desired beat signal is then detected relative to some reference signal which has the same frequency as the beat signal.

There are at least three possible ways to derive such a reference signal. The reference signal may itself be the beat of the same two waves but as received at a second receiving antenna. Alternatively, a third wave may be radiated from one of the two radiators. Then the reference signal can be generated as the beat signal which is generated by the two waves which are radiated from the same one of the two radiators. As another alternative, a reference wave may be radiated at the beat frequency from one of the two radiators. Other reference signals may also be generated.

A signal which is related to the distance between the interference fringes is detected by receiving, mixing and filtering the radiated waves at at least two different receiving antennas, and preferably three different receiving antennas, to detect a second beat signal. The second beat signal is then used as the reference for determining the phase difference between the second beat signal and the first beat signal.

The term "beat signal" or "beat" includes the use of corresponding signals which have been translated or heterodyned to a different frequency.

A phase correction factor may be determined, if the distance between the two radiators is known, by the radiation of a third wave from one of the two radiators as described above so that the reference signal is derived by detecting the beat signal of the third wave and the other wave from the same radiator. The phase correction factor is the phase angle by which the phase of the radiated wave should be modified or shifted.

In the preferred embodiment of the invention as applied to the solar power satellite system, a reference antenna is selected, for example at the center of the space antenna array. The phase measurements which are made in accordance with the invention are then made for each other subarray antenna relative to the reference antenna.

Thus, the reference antenna and, in timed sequence, each subarray transmit waves to generate the required travelling wave on earth and the reference beat signal. These are monitored to then generate a phase correction factor. This phase correction factor is then transmitted from earth by way of an appropriate conventional telemetry system to the space antenna and used to shift the phase of the wave from the particular antenna being tested.

One major advantage of the present invention as applied to the solar power satellite is that these metering procedures may be performed at a frequency different from the power transmission frequency so that the phase correction factor for each subarray antenna may be corrected and updated while all the other subarrays continue transmitting power. Thus, each subarray ceases transmitting power only while it is being tested and updated with its needed phase correction factor.

As will be seen, the phase differences which are measured in accordance with the present invention are a function of many parameters. They are, for example, a function of the distance between the radiators, the distance the radiators are spaced away from the receiving antennas and the orientation angle between the plane of the receiving antennas and a line connecting the radiating antennas. They are also, of course, a function of the phase shifts of the satellite on-board circuitry. It should therefore be noted that any one of these may represent an unknown which is to be measured by travelling wave interferometry if enough information is known about the other parameters.

DESCRIPTION OF THE DRAWINGS

FIG. 1 is a diagram in perspective illustrating the generation of travelling waves in accordance with the present invention.

FIG. 2 is a diagram in perspective illustrating the generation of the reference wave front along with the travelling waves in accordance with the present invention.

BEST MODE FOR CARRYING OUT THE INVENTION

The invention contemplates the generation of a travelling interference fringe pattern which travels across a surface as a travelling interference wave. The phase of a signal which is representative of this travelling wave is compared to the phase of at least one other signal. Ordinarily, the beat of the two radiated waves which generate the travelling interference pattern is the signal which represents the travelling interference wave (usually referred to as the travelling wave). This system may be applied in the two different systems represented by FIG. 1 and FIG. 2.

In FIG. 1 the phase of the travelling wave as received at one point is compared to the phase of the travelling wave as received at one or two other points. This system gives information relative to the physical spacing of the two radiators at points 1 and 2 and the azimuth of those radiators. This we call mapping.

The phase of the travelling interference wave may also be compared to the phase of a reference wave which does not travel. This is used to determine a phase correction factor for compensating radiated waves which accordingly we call phase compensation.

Figure 3:
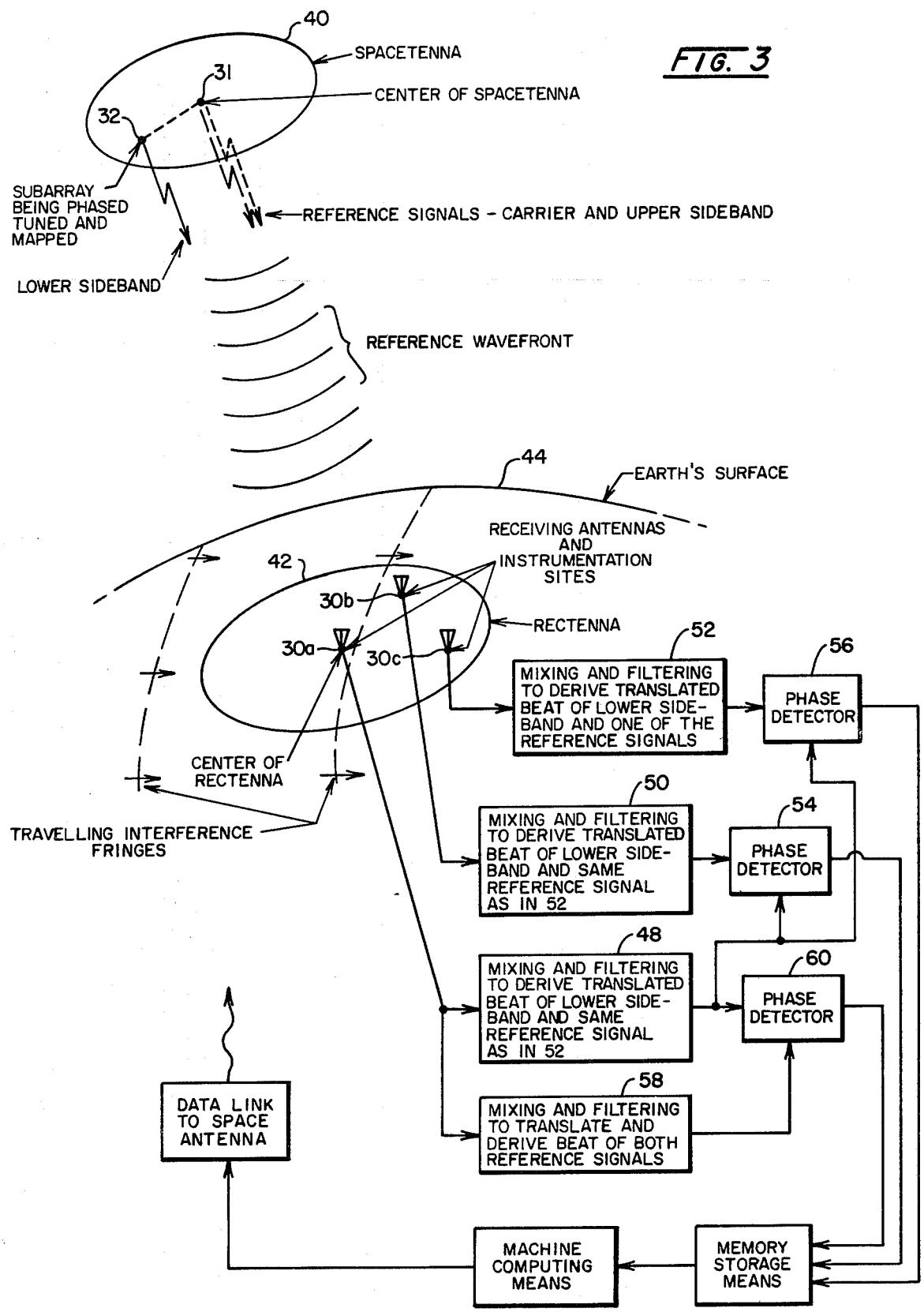
FIG. 3 is a block diagram illustrating the preferred embodiment of the invention.

FIG. 3 illustrates a system in which both of the above phase measurements are made in connection with a solar power satellite in order to generate phase correction factors to accomplish the desired beam pointing and phasing. It is unnecessary to make both types of phase measurements where sufficient additional information is given. For example, if the azimuth, orientation and distance between the radiators at points 1 and 2 are known, then the phase correction factor may be determined by using only the phase measurements illustrated in FIG. 2.

The phase comparison techniques are greatly facilitated by radiating waves at frequencies which are represented by a carrier and two opposite sidebands such as are well known in connection with the amplitude modulation of a carrier for communciation purposes. However, frequency multiplication and division techniques and variations perhaps may also be used.

By radiating the carrier or center frequency along with one sideband from the reference radiator and by radiating the other sideband from the second radiator, the desired beat signals may easily be obtained using conventional AM demodulation. Thus, a simple detector may be used which consists of the conventional diode detector using a low pass filter for obtaining the beat signals in accordance with the present invention.

FIG. 3 illustrates a solar power satellite embodying the present invention. It has a space antenna 40 which comprises an array of a multiplicity of individual subarray antennas or radiators including radiator 31 at the reference point in the center of the space antenna 40 and radiator 32 which is exemplary of the other radiators in the array of the space antenna.

The microwave energy is directed from the space antenna 40 to an antenna field 42 located on the surface of the earth 44. The energy-receiving antennas form a rectenna or rectifying antenna array which can, but preferably do not, include receiving antenna 30a at the center of the rectenna field 42 and receiving antennas 30b and 30c all three of which are receiving antennas used for making the measurements and practicing the present invention. There are a plurality of additional individual energy-receiving antennas in the rectenna array for receiving power from the solar power satellite. It is only necessary that travelling wave receiving antennas 30a, 30b and 30c be connected to instrumentation for practicing the mapping techniques.

The blocks of FIG. 3 which are connected to the three receiving antennas 30a, 30b and 30c illustrate the apparatus which is connected to these three receiving antennas and illustrate the operation of that apparatus.

An on board circuit is used on the solar power satellite to provide a signal of the desired frequency and at a standard reference phase relative to which the phase of each subarray radiator in the space antennas may be adjusted. This allows each subarray radiator to be phased a number of degrees of phase shift with respect to this fixed reference standard. It is analogous to the use of sea level for determining the relative height of points on earth.

The radiator 31 is connected to a signal generating means of conventional design which generates the first periodic signal and applies that signal to the first radiator 31. The first radiator thereby radiates a first, electromagnetic, periodic wave from the point 31 at a first frequency. Similarly, another signal generating means is connected to a second radiator 32 for radiating a second, electromagnetic periodic wave from the point 32 at a frequency which is different than the first frequency radiated from the point 31.

A first receiving antenna 30a is connected to a mixing and filtering means 48 which detects the beat signal of the two waves described above which are received at the receiving antenna 30a.

Similar mixing and filtering means 50 and 52 are also connected respectively to receiving antennas 30b and 30c for detecting the beat signals of the two waves which are described above as received at the receiving antennas 30b and 30c.

Phase detecting means 54 and 56 are connected to the outputs of the mixing and filtering means 48, 50 and 52 for detecting the phase difference between each of the detected beat signals. For example, the phase detector 54 is connected to detect the phase difference between the travelling interference wave as received at the receiving antennas 30a and 30b. Similarly, phase detecting means 56 detects the phase difference between the travelling interference wave as received at receiving antenna 30a and the travelling wave as received at the receiving antenna 30c.

A second periodic, electromagnetic wave is also radiated from the radiator 31. The two waves being radiated from radiator 31 may be generated by the same, although more complex, signal generating means and may be considered as two reference waves. Preferably, they consist of a carrier and one sideband of the carrier. For example the reference signals may comprise a carrier at 2350 MHz and an upper sideband at 2351 MHz.

The wave radiated from the radiator 32 is a third wave in addition to the reference waves from radiator 31. Preferably the wave from radiator 32 is an opposite sideband frequency which is spaced on the opposite side of the carrier reference wave by a frequency band equal to the spacing of the frequency of the other sideband from the carrier which is radiated from radiator 31.

An additional mixing and filtering means 58 is connected to the receiving antenna 30a for detecting a beat signal derived from the two reference signals which are radiated from the radiator 31. The output of the mixing and filtering means 58 thus provides a beat signal at the modulation frequency or beat frequency of the two reference signals. That reference beat signal and the beat signal derived from the output of the mixing and filtering means 48 will be at the same frequency and are applied to a phase detector 60 for detecting the phase difference between the two beat signals.

The array of radiating antennas forming the space antenna may be considered to lie approximately in a planar configuration. The space antenna may be considered as being pointed at the receiving antenna field on earth when a line through its central, reference radiating antenna perpendicular to the plane at the space antenna extends through the center of the receiving antenna, that is through the receiving antenna 30a.

Mechanical deformations which cause the subarray radiator antennas of the space antenna to move away from their regularly spaced positions on the plane of the antenna may be considered as having two components of movement. These mechanical deformations have one component perpendicular to the average plane of the space antenna which moves the individual subarray radiator antennas out of the average plane. The mechanical deformations may also have movement which moves the individual radiator antennas parallel to the average plane of the space antenna.

In a generalized case the average plane of the space antenna will not be pointed at the receiving antenna field on earth. However, this problem can be overcome simply by hypothesizing a virtual antenna plane which is perfectly pointed at the center of the receiving antenna field on earth and which includes the reference radiator 31 of the space antenna.

For purposes of the present invention and the computations involved therewith, all space antenna subarray radiators which do not lie on this virtual plane are treated merely as a mechanical deformation of the space antenna in which the individual subarray antennas have moved away from the plane of the virtual antenna.

Therefore, when a phase correction factor is computed for each of the subarray antennas, the phase correction factor also compensates for the positioning of the actual radiator away from the plane of the virtual antenna.

The techniques of the present invention may be performed with sidebands equally spaced on opposite sides of an appropriate carrier frequency. For example, a solar power satellite may radiate power at a frequency of 2450 MHz. During performance of the techniques of the present invention, power generation may be terminated and the power transmission frequency may be the carrier frequency with sidebands spaced on opposite sides of 2450 MHz. Alternatively and preferably, the power transmission frequency may be one of the sidebands. Preferably, for example, it might be the lower sideband with the carrier at 2451 MHz and an upper sideband at 2452 MHz.

If it is desired to leave the power transmission uninterrupted, the phase measurements in accordance with the present invention may be performed at frequencies which are different from the frequency at which the power is transmitted. For example, the solar power satellite may radiate energy at a frequency of 2450 MHz. The metering in accordance with the present invention is performed at two different frequencies so that the radiated power waves will not interfere with the metering system. Thus, the phase compensation factor is computed from measurements made at two different frequencies and a phase compensation factor will be determined which gives proper phase compensation for a still different frequency such as the power beam frequency.

However, the phase measurements found in accordance with the present invention are dependent upon both internal space antenna circuitry and structural or mechanical deformations in the solar power satellite. These phase measurements are the result of frequency dependent and frequency independent components. The internal space antenna circuitry may create both frequency dependent and frequency independent components. Structural changes in the space antenna create only a frequency dependent component. Therefore, when two different test frequencies are used to determine the phase compensation factor, the difference, if any, between the measurements at the two frequencies will be entirely due to frequency dependent components.

Thus, if the internal space antenna circuitry created no frequency dependent phase components and there were no structural deformations, then if the space antenna were phase compensated at a test frequency, it would also be properly compensated at the power beam frequency. However, the same would not be true if there were structural deformations in the space antenna. Changes in the physical spacing of the individual radiating antennas of the space antenna will require a different phase correction factor for the operating or power beam frequency than would be required if the space antenna were operating at the test frequency.

This is because the mechanical deformations will change the physical distance which the waves must travel regardless of their frequency. However, because waves of different frequencies have different wave lengths, a change of a given physical dimension will represent a different phase angle for waves of different wave lengths.

This problem may be overcome by first performing the procedures of the present invention with a carrier and a first pair of sidebands. Using the measured phase differences, which are measured in accordance with the travelling wave interferometry techniques described above, a first phase compensation factor is computed.

Then, the procedure is repeated using a second set of sidebands for computing another phase compensation factor. If no change results in the phase compensation factor computed from these two tests, it can be concluded that the reference radiator and the particular subarray radiator under test lie in a plane which is pointed at the receiving antenna, i.e., there are no mechanical deformations.

However, if the phase compensation factor changes when determined at the second set of sidebands, then a frequency dependent component is present and the two phase compensation factors are used to compute the phase correction which is necessary at the operating frequency $\omega_T$ or 2450 MHz for example. They can also be used to calculate which part of the phase correction factor is due to mechanical deformation and which part is due to electrical changes in the internal circuitry of the space antenna if it is known how the phase of the internal space antenna circuitry varies with frequency. This would be known from measurement or circuit analysis.

As still another alternative embodiment, one of the reference waves which is radiated from the space antenna can be the entire composite power beam if it is substantially phase compensated. From a great distance, the power beam will appear at the receiving antenna field to be an approximately single wave radiated from a point source.

A test wave, translated away from the power beam frequency, for example by 10 MHz, is radiated from the particular subarray radiator being phase compensated. The translated wave from the subarray being phase compensated (e.g. radiator 2) and the power beam will generate a travelling wave. Thus, detection of the beat of those two will give a beat signal representing the travelling wave.

A reference signal is also transmitted from the central radiator (e.g., radiator 1) at that beat frequency or at a frequency which is translated by the instrumentation at the receiving antenna field to that beat frequency. The phase difference is then measured between the beat representing the travelling wave and the reference signal derived from the reference wave from the central radiator.

As a further alternative the frequency of the reference signal from the central radiator, instead of being radiated at the beat frequency of the travelling wave, may be radiated at a frequency which is translated from the power beam frequency by an opposite but equal band as the frequency from the radiator under test is translated from the power beam frequency. In this manner the entire power beam frequency effectively becomes one of the two reference waves described above as being radiated from the central radiator 1.

The use of the entire power beam as a reference wave is possible because of the fact that the effect of a single subarray radiator on the composite power beam is negligible. Therefore, each subarray radiator may be phase compensated in sequence, each radiator cuasing minimal disturbance of the substantially accurately phase compensated power beam, which is also used as a reference signal.

MATHEMATICAL COMPUTATION

For the most simple mode of phase tuning a solar power satellite or other radiators, the power beam is turned off for an interval of time during which the subarrays are phase compensated in sequence.

Figure 5:
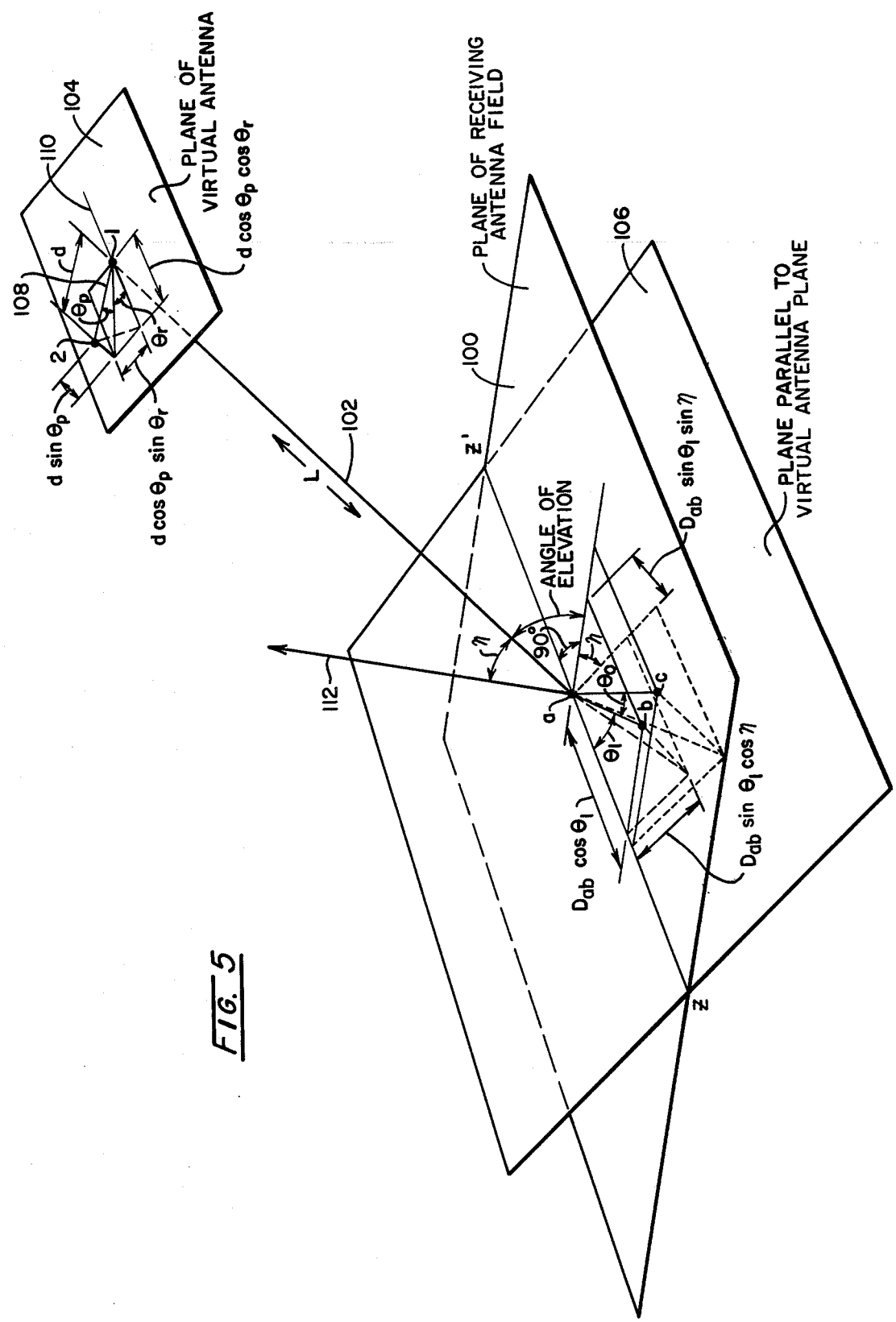
FIG. 5 is a geometrical diagram illustrating the generalized positioning of the two radiators and a receiving antenna on earth and illustrating the definitions of parameters used in the computations in accordance with the present invention.

If a wave at the power beam frequency $\omega_T$ is transmitted from the subarray radiator being phase compensated as a lower sideband and if the two reference waves are radiated from the central reference subarray radiator of the space antenna, then the phase compensation angle $\Delta\phi_{C2}$, which is the angle of phase shift needed to correct or compensate the wave radiated from the subarray radiator under test, may be computed from the equation:

$$\Delta\phi_{C2} = \Delta\phi_{ar} - \frac{\omega_T d^2}{2Lc} \quad [1.]$$

Where d is the distance between the two radiators, L is the distance from the reference subarray radiator (e.g., 1) to the receiving antenna at the center (e.g., a) of the receiving antenna field, and c is the speed of light. These terms are shown in FIG. 5 described below. The term d is either known with sufficient accuracy from the original construction plans or alternatively may be measured by the mapping techniques of travelling wave interferometry forming a part of the invention. The term $\Delta\phi_{ar}$ is the measured phase difference between the beat which represents the travelling interference wave and the reference beat signal. As used in this application the "measured" phase difference is within ±180° since measuring circuitry can not distinguish integral multiples of $2\pi$ plus such a measured phase difference.

If, as an alternative, the phase compensation techniques are to be done at a frequency which is translated from the power beam frequency $\omega_T$ so that the power beam from the space antenna will be substantially uninterrupted, then the phase compensation angle $\Delta\phi_{C2}$ is determined from the expression:

$$\Delta\phi_{C2} = \frac{(\omega_T - \omega_n)\phi_m - (\omega_T - \omega_m)\phi_n}{\omega_m - \omega_n} - \frac{\omega_T d^2}{2Lc} \quad [\text{II.}]$$

where: $\omega_m$ is the radian frequency of the wave radiated from the subarray radiator being phase compensated (e.g., the lower sideband) during radiation of the first set of sidebands and $\omega_n$ is the radian frequency of the wave radiated from the subarray radiator being phase compensated during radiation of the second set of sidebands. $\phi_m$ is equal to the detected phase difference $\phi_m$ plus $-2\pi$, 0 or $+2\pi$, during radiation of the first set of sidebands, between the reference beat signal resulting from the beat between the two waves radiated from the central reference subarray radiator and the travelling wave beat signal resulting from the beat of the wave from the subarray radiator being phase compensated with the carrier frequency wave from the central radiator.

$\phi_n$ is the corresponding phase difference but during radiation of the second set of sidebands. However, there is a phase ambiguity problem in connection with the measurement of $\phi_m$ and $\phi_n$. It can be resolved by using as $\phi_n$ the measured value $\phi_n$ and by using as $\phi_m$ one of three possible values which $\phi_m$ can have. The three possible values are dependent upon which of three sets of conditions are true. If the absolute value of $\phi_m$ less $\phi_n$ is less than $\pi$ then $\phi_m$ is set equal to $\phi_m$. If the absolute value of $\phi_m$ less $\phi_n$ is not less than $\pi$, then $\phi_m$ is either $\phi_m + 2\pi$ or $\phi_m - 2\pi$. If $\phi_m$ is less than 0, then $\phi_m$ will be $\phi_m + 2\pi$. If $\phi_m$ is not less than 0 then $\phi_m$ is $\phi_m - 2\pi$.

Stated in mathematical notation.

If $|\phi_m - \phi_n| < \pi$ then $\phi_m = \phi_m$     [III]

Otherwise, if $\phi_m < 0$ then $\phi_m = \phi_m + 2\pi$     [IV]

and if $\phi_m > 0$ then $\phi_m = \phi_m - 2\pi$ (It can be shown that $\phi_m$ can never be 0)

Figure 4:
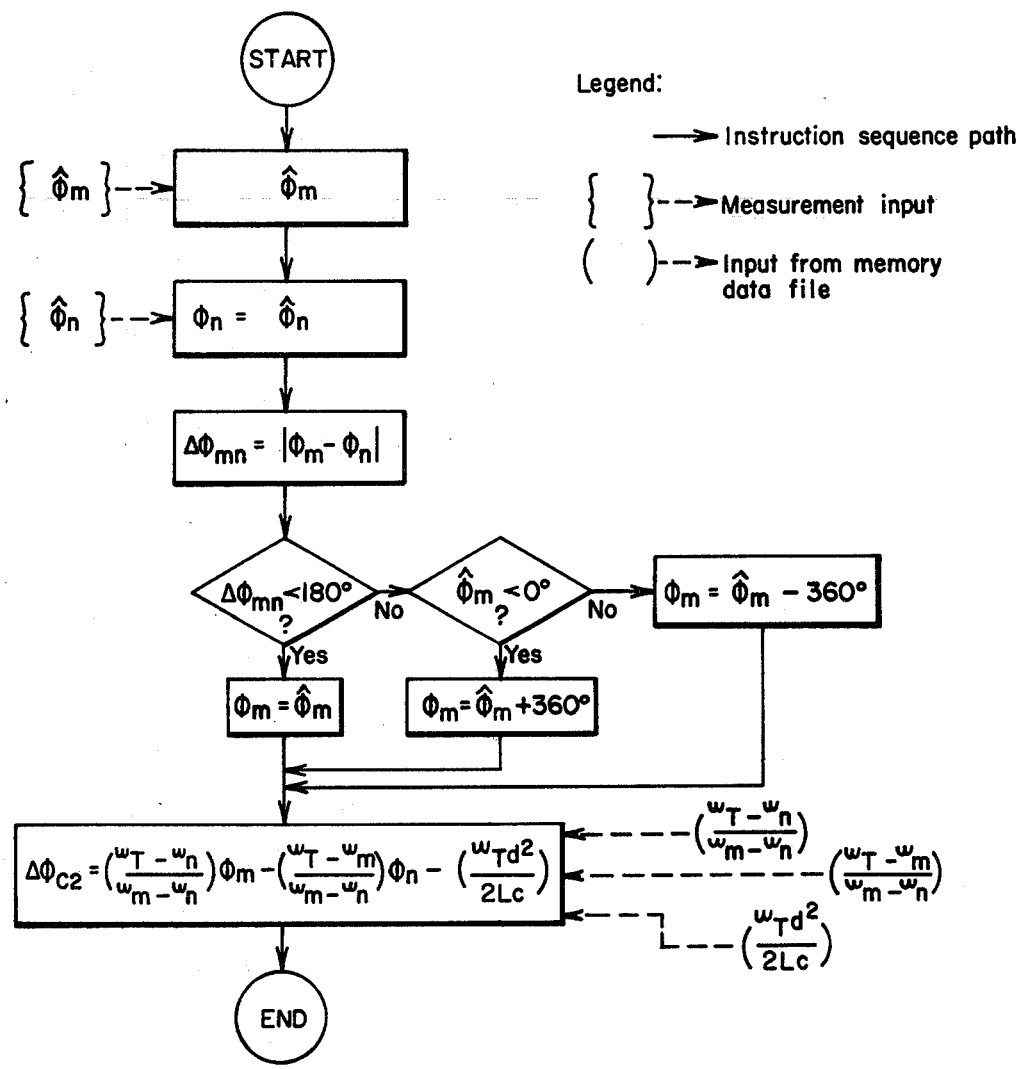
FIG. 4 is a flow chart illustrating computational operations for determining a phase correction factor.

FIG. 4 is a flow chart representing the computer computation of the phase compensation factor $\Delta\phi_{C2}$ from the phase angles $\phi_m$ and $\phi_n$ which are measured in accordance with the invention.

Use of the measured phase angles for the mapping techniques of the present invention is illustrated in connection with the geometrical diagram of FIG. 5.

Points 1 and 2 illustrate the pair of radiators on the space antenna while points a, b and c represent the three receiving antennas located in the receiving antenna field. The point 1 on the space antenna is the position of the central reference radiator and the point a is at the center of the receiving antenna field.

The mathematical parameters are defined with reference to the plane 100 of the receiving antenna field and a line 102 which joins the center of the receiving antenna field at point a with the spacetenna radiator at point 1. The distance between point a and point 1 is represented by the length L of the line 102.

A virtual antenna is hypothesized, as described above, as existing in a plane 104 which is perpendicular to the line 102 and contains the point 1 of the space antenna. For mathematical purposes, a plane parallel to the plane 106 of the virtual antenna is constructed to be not only parallel to the virtual antenna but to pass through the point a at the center of the receiving antenna field. The plane 100 of the receiving antenna field intersects along the line Z–Z' of the plane 106 which is parallel to the virtual antenna plane.

A line 108 joins points 1 and 2 on the space antenna and in a generalized case does not lie in the plane 104 of the virtual antenna. The distance between points 1 and 2 is d, the length of line 108. We define an angle $\theta_p$ which is the inclination of the line 108 joining points 1 and 2 relative to the virtual antenna plane 104. We similarly define the angle $\theta_r$ as the observed orientation of the points 1 and 2 which is the angle between the projection of the line 108 joining points 1 and 2 onto the virtual antenna plane 104 and the line 110 which extends through the point 1 and is parallel to the intersection line Z–Z'.

Therefore, from these mathematical parameters of the space antenna various other line lengths can be determined from conventional plane geometry and some are shown on FIG. 5.

At the antenna field the angle $\eta$ is the angle from the zenith of the central receiving antenna at point a with respect to the plane of the receiving antennas to the central reference radiator at point 1. The zenith is a point directly overhead and usually is with respect to a plane which is tangent to the earth at the receiving antenna a because that plane is the plane of the antenna. The angle $\eta$ is the angle between a line 112 which is a ray from the point a perpendicular to the plane of the receiving antenna field and the line 102 which joins the points a and 1. From plane geometry, the angle $\eta$ is also the angle between the plane 106, which is parallel to the virtual antenna and the plane 100, which is the plane of the receiving antenna field as observed at the central receiving antenna a at the center of the receiving antenna field.

The angle $\theta_o$ is the angle between the second and third receiving antennas located at points b and c as observed at point a, that is $\theta_o$ is the angle between the line joining points a and b and the line joining points a and c. The angle $\theta_1$ is the angle between the line joining points a and b and the line Z—Z'. The distance between the points a and b is $D_{ab}$ and the distance between point a and c is $D_{ac}$. Although not shown in the drawings, the letter c represents the velocity of light, $\omega_2$ is the radian frequency of the wave from point 2 and $\Delta\omega$ is the difference in radian frequency between the waves from the points 1 and 2. Thus, $\omega_1$, the radian frequency of the wave from point 1, is $\omega_2 + \Delta\omega$.

In performing the mapping techniques described above, one wave is radiated from point 1 and one wave at a different frequency is radiated from point 2, all as described above. Both of these waves are received at each of the points a, b and c. The beat of these waves at each receiving point represents the travelling wave as observed at the corresponding receiving point and, as described above, the relative phase of these beat signals is measured. The phase angle between the beat signal as observed at point a and the beat signal as observed at point b, is represented by $\Delta\phi_{ab}$ and the phase angle between the beat of these waves as observed at point a and as observed at point c is given by the expression $\Delta\phi_{ac}$.

These geometrical and electronic parameters may then be used to determine d the distance between the points 1 and 2, and $\theta_r$. Alternatively, of course, if one or more of the parameters d or $\theta_r$ are known, another parameter may be determined. Since the following are two equations which must be simultaneously solved, it follows from mathematical considerations that any two of the parameters may be the unknowns for which the equations are solved if the other parameters are known.

The simultaneous equations which must be solved to find d and $\theta_r$ are as follows:

$$d\cos\theta_r = \frac{\Delta\phi_{ab} - b_1}{a_1}\sin(\theta_1 + \theta_0) - \frac{\Delta\phi_{ac} - b_2}{a_2}\sin\theta_1 \quad \text{V.}$$

$$d\sin\theta_r = \frac{\frac{\Delta\phi_{ab} - b_1}{a_1}\cos(\theta_1 + \theta_0) - \frac{\Delta\phi_{ac} - b_2}{a_2}\cos\theta_1}{\cos\eta} \quad \text{VI.}$$

if $\theta_p$ is very small so that $\sin\theta_p \simeq \theta_p$ and therefore $\cos\theta_p \simeq 1$. wherein:

$$a_1 = \frac{\omega_2 D_{ab}}{Lc} \quad b_1 = \frac{\Delta\omega D_{ab}^2}{2Lc} - \frac{\Delta\omega}{c} D_{ab}\sin\theta_1\sin\eta \quad \text{VII.}$$

$$a_2 = \frac{\omega_2 D_{ac}}{Lc} \quad b_2 = \frac{\Delta\omega D_{ac}^2}{2Lc} - \frac{\Delta\omega}{c} D_{ac}\sin(\theta_1 + \theta_0)\sin\eta$$

wherein $\Delta\phi_{ab}$ is the total phase difference between the beats detected at said first and said second antennas and $\Delta\phi_{ac}$ is the total phase difference between the beats detected at said first and said third antennas. and wherein $$\Delta\phi_{ab} = \phi_{ab} + m\,2\pi \quad \text{VIII.}$$

$$\Delta\phi_{ac} = \phi_{ac} + n\,2\pi$$

wherein $\phi_{ab}$ and $\phi_{ac}$ are the *measured* valves of the above phase shifts respectively and m and n are integers representing phase ambiguities.

Equations VIII represent the possible phase ambiguities which can result from positioning the receiving antennas too far apart. For example, if a phase of 5° is measured, the questions remain whether it represents 5°, 365°, 725°, etc.

In the above equations the following parameters may be electronically stored as data in an electronic computer and are defined as:

$D_{ab}$ = the distance from a first one of said antennas to a second one of said antennas;

$D_{ac}$ = the distance from said first antenna to the third one of said antennas;

$\theta_0$ = the angle at said first antenna between said second and said third antennas;

$\theta_1$ = the angle between a line joining said first antenna and said second antenna and the line of intersection between the plane of said antennas and a plane through said first antenna and perpendicular to a line joining said first antenna and said first point in space;

$\omega_2$ = the radian frequency of the wave from the second of said points in space;

$\Delta\omega$ = the difference in radian frequency between the waves from said points in space;

L = the distance from a first one of said points in space to a first one of said receiving antennas;

c = the velocity of light; and $\eta$ = the angle from said first radiator to the zenith of said first receiving antenna relative to the plane of said receiving antenna.

If the receiving antennas are also positioned so that $$\theta_1 = 0°, \theta_0 = 90°, D_{ab} < \frac{\pi Lc}{\omega_2 R} \text{ and}$$

$$D_{ac} < \frac{\pi Lc}{\omega_2 R[1 + |(\tan\eta)\theta_p|]|\cos\eta|}$$

where R is the radius of the space antenna, then equations V and VI simplify to:

$$d\cos\theta_r = \frac{\phi_{ab} - b_1 + m2\pi}{a_1} \quad \text{X.}$$

$$d\sin\theta_r = -\frac{\phi_{ac} - b_2 + n2\pi}{a_2\cos\eta} \quad \text{XI.}$$

wherein m and n are integers described above, $a_1$ and $a_2$ are as above and $$b_1 = \frac{\Delta\phi D_{ab}^2}{2Lc}$$

$$b_2 = \frac{\Delta\omega D_{ac}^2}{2Lc} - \frac{\Delta\omega}{c} D_{ac}\sin\eta$$

Figure 6:
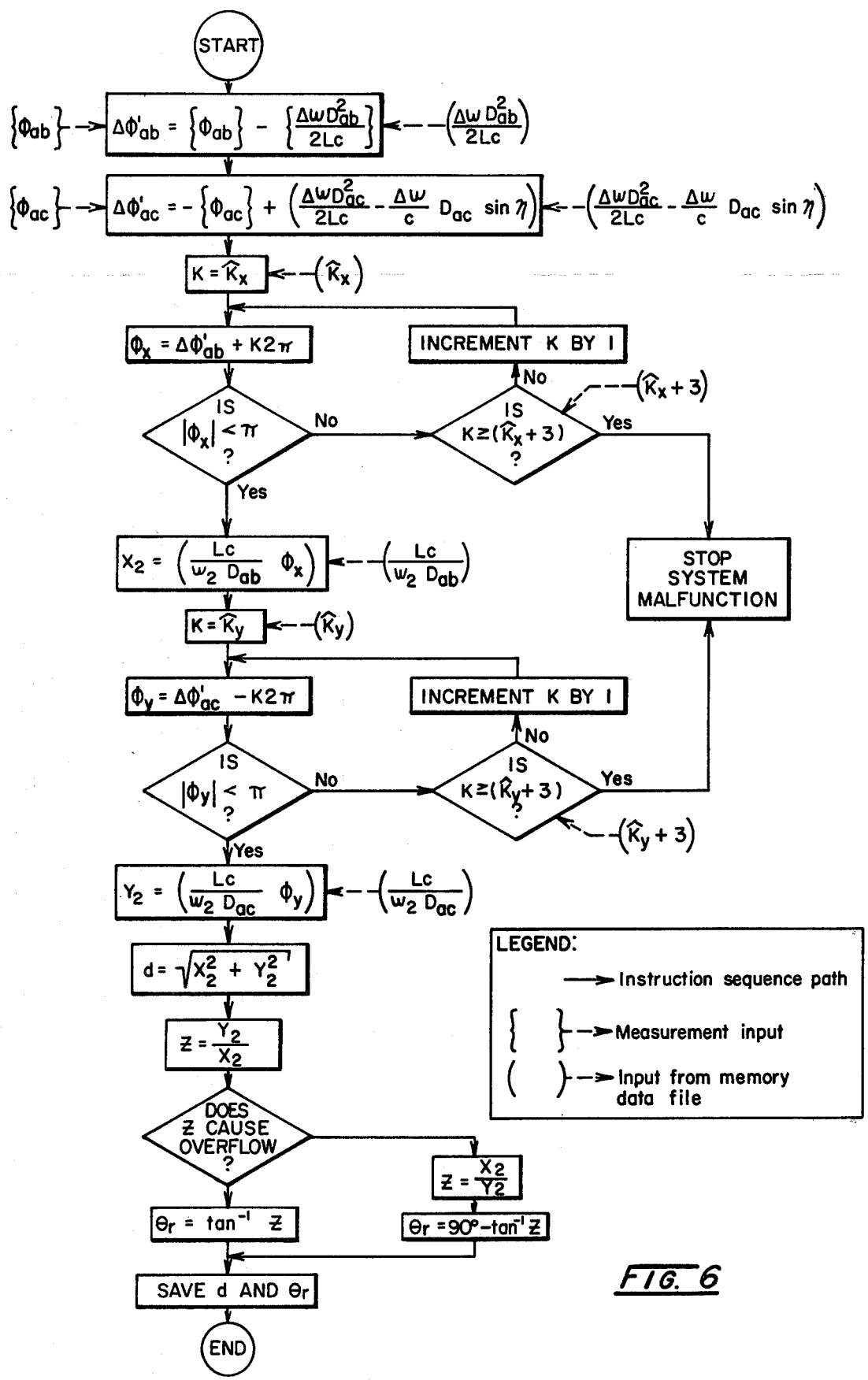
FIG. 6 is a flow chart illustrating the computational operations for the mapping techniques of the present invention.

The computer solution of equations X and XI is illustrated in the flow chart of FIG. 6. The term k is an integer representing values of m and n and is determined by the computer processing illustrated in FIG. 6 using as initial values $k_x$ and $k_y$ respectively where $k_x$ and $k_y$ are specified by the following expressions:

$$\frac{b_1}{2\pi} - \frac{3}{2} \leq \hat{k}_x < \frac{b_1}{2\pi} - \frac{1}{2} \quad \text{XII.}$$

$$\frac{b_2}{2\pi} - \frac{3}{2} \leq \hat{k}_y < \frac{b_2}{2\pi} - \frac{1}{2} \quad \text{XIII.}$$

CIRCUITRY

Figure 7:
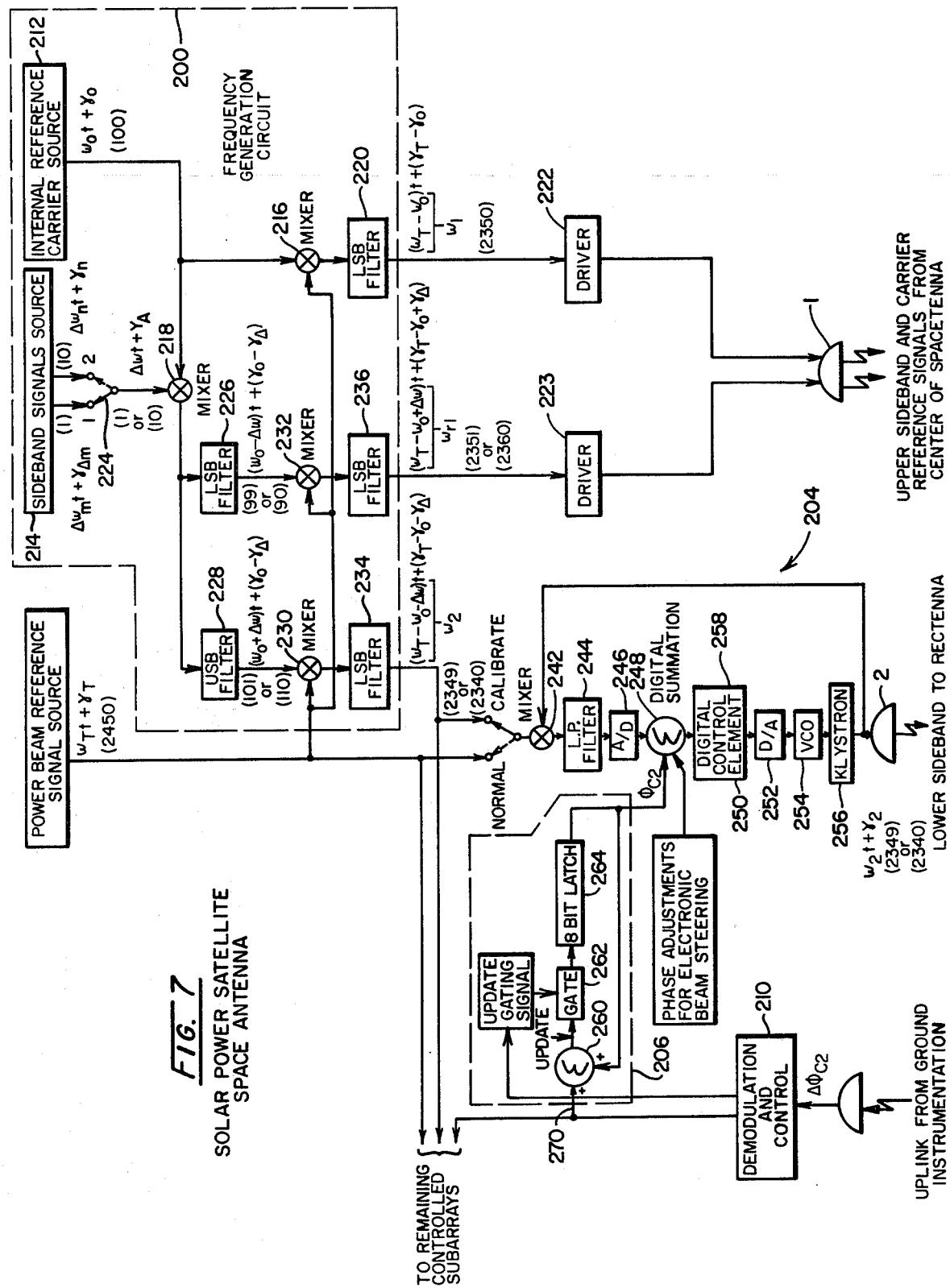
FIG. 7 is a detailed block diagram illustrating the circuitry used on a solar power satellite embodying the present invention.
Figure 8:
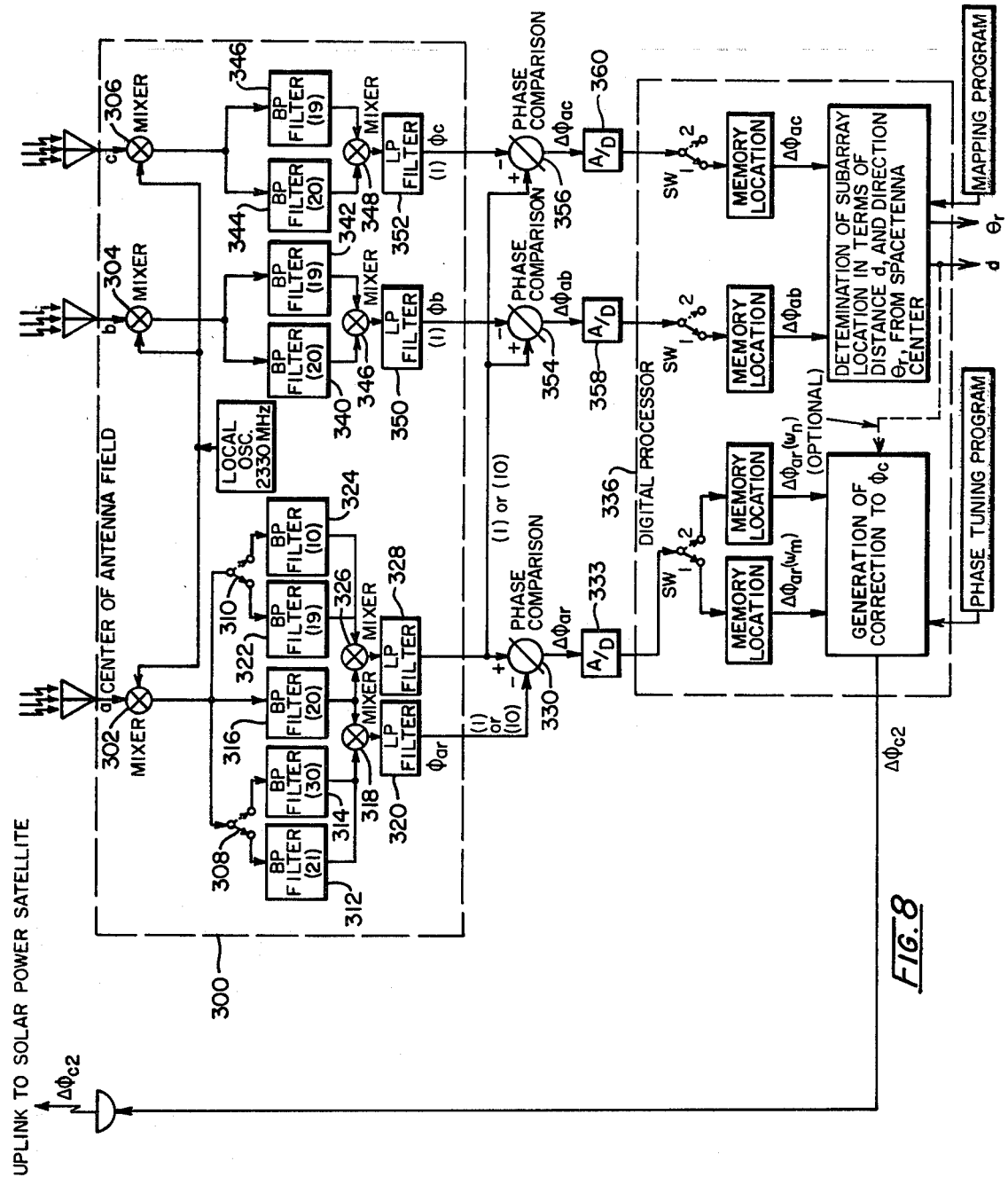
FIG. 8 is a detailed block diagram illustrating the circuitry of the receiving antennas, instrumentation and computer circuits for computing the phase correction factor in accordance with the present invention.
Figure 9:
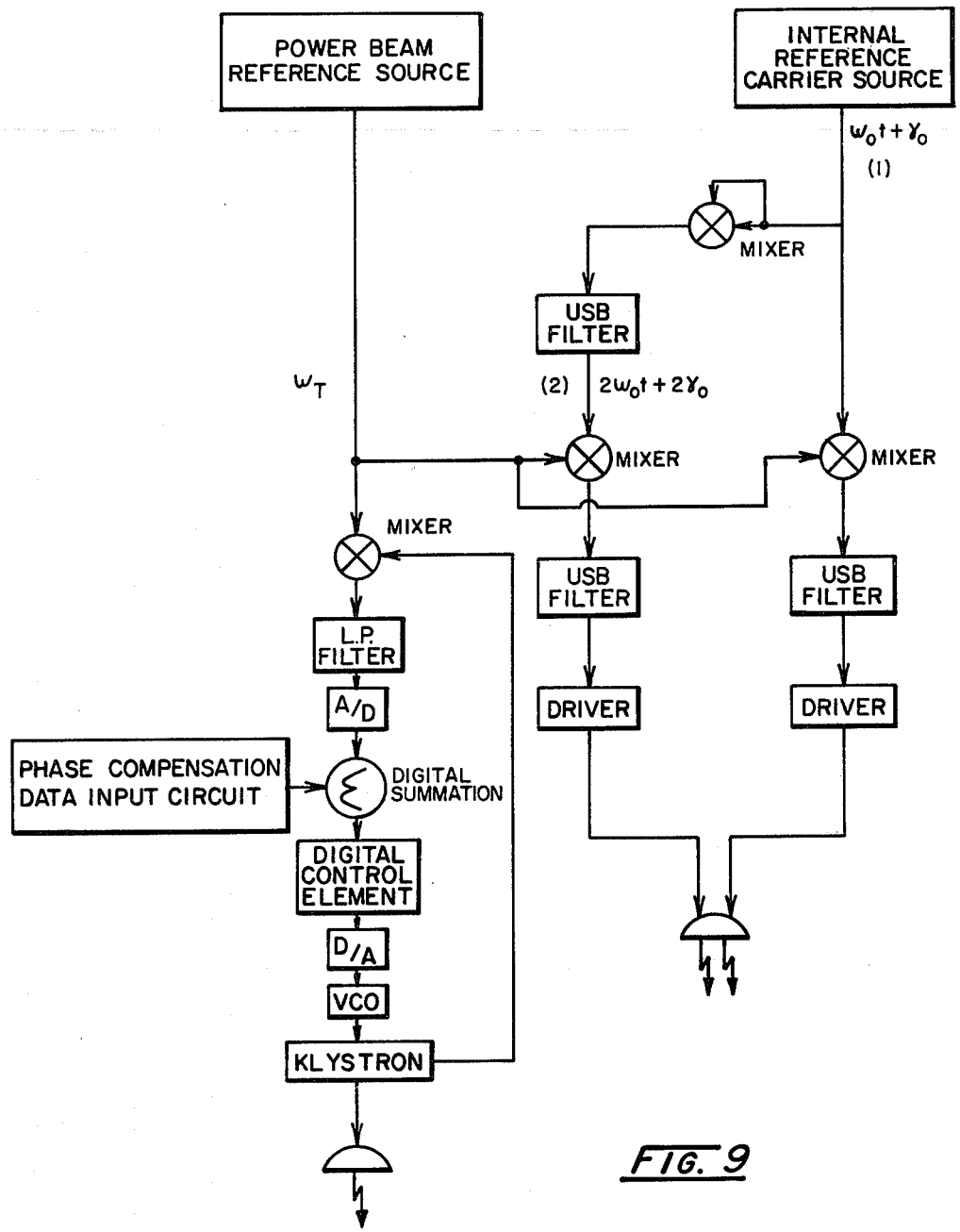
FIG. 9 is a block diagram of solar power satellite circuitry embodying the present invention which is operated at the power beam frequency.

FIGS. 7 and 8 illustrate the more complex embodiment of the invention in which the techniques of travelling wave interferometry are applied to the solar power satellite system using a test frequency which is translated from the power beam frequency. This circuit can be simplified substantially if the travelling wave interferometry techniques are performed at the power beam frequency. The simplified circuit is shown in FIG. 9 and described below after the description of FIGS. 7 and 8.

As a part of the on-board circuitry of the solar power satellite system, there is a frequency generation circuit, labelled generally as 200, which is used to generate the appropriate carrier and sidebands for application to the radiators 1 and 2. A power beam reference source 202 generates a signal at the power beam frequency of, for example, 2450 MHz. The circuit driving the radiator 2, which is exemplary of one of the many radiators which are sequentially tested, is a phase locked loop 204 connected to a digital data input circuit 206.

The phase compensation angle $\Delta\phi_{C2}$ arrives by conventional telemetry at the telemetry antenna 208 and is demodulated by demodulator 210. The data is then applied to the digital data input circuit 206 for updating the phase shift in the phase locked loop 204.

Examining the circuitry in more detail, the frequency generation circuit 200 includes an internal reference carrier source 212 and a sideband signal source 214 which are conventional oscillator or frequency generation circuits. For convenience, at appropriate places in the drawings we have labelled a legend indicating a mathematical expression for the total phase of the signal at the corresponding positions in the circuitry. Additionally, we show exemplary values of the frequencies in parenthesis at the appropriate positions.

The signal from the internal reference carrier source is used to generate the translated carrier signal. It is applied to a mixer 216 and a mixer 218. At the mixer 216 it is mixed with a signal at the power beam frequency and filtered by the filter 220 to recover the difference frequency which serves as the test carrier applied through a driver 222 to the radiator 1. This becomes one of the two reference signals.

The reference carrier signal from the source 212 is also mixed at the mixer 218 with one of two sideband signals selected by the position of electronic switch 224. At one position of the switch 224 a first pair of sidebands is generated and at the other position the second pair of sidebands are generated for use as described above. The signal from the sideband signal source 214 is mixed at the mixer 218 with the internal reference carrier source and the result is filtered by filters 226 and 228 to recover the sum and difference frequencies at the input to the mixers 230 and 232.

The sum frequency is mixed at the mixer 230 with the power beam reference signal from the source 202 and the difference frequency is recovered by the filter 234 to provide the lower sideband signal for eventual application to the radiator 2. Similarly, the difference frequency from filter 226 is mixed with the power beam reference signal at the mixer 232 and filtered by the filter 236 to recover the difference frequency and provide the upper sideband reference signal for transmission from the radiator 1.

The translated carrier and translated upper sideband which are output from the filters 220 and 236 are applied through drivers 222 and 223 to the radiator 1. The drivers include conventional circuitry such as impedance matching circuitry and any gain circuitry which may be desired.

The input to the phase locked loop 204 is determined by the position of the switch 240. When the radiator 2 is operating normally for transmitting power to the receiving antenna field on earth, the switch 240 is connected to receive the power beam signal from the source 202. However, when the particular radiator 2 is selected to be the radiator under test for purposes of phase compensation (i.e., calibration), the switch 240 is connected to apply the lower sideband from the filter 234 to the phase locked loop 204.

The phase locked loop includes a mixer 242 having its output applied to a low pass filter 244, the output of which is converted to digital form by an analog to digital converter 246. The output from the analog to digital converter 246 along with inputs from other digital sources are applied to a digital summation junction 248. The digital summation junction may conveniently be a microprocessor which performs the necessary digital summation from its digital data inputs shown in FIG. 7.

The output from this summation junction 248 is applied to a digital control element 250 which includes an integration function as well as other functions which may be desired, in accordance with conventional closed loop theory. The output of the control element 250 is then applied to a digital to analog converter 252 which applies its analog output signal to a voltage controlled oscillator 254. The voltage controlled oscillator 254 drives the klystron 256, the output of which is applied to the radiator 2. A feedback loop is provided by the conductor 258 connected from the output of the klystron 256 back to the mixer 242.

The circuits of the phase locked loop 204 should be physically located as nearly as possible to the radiator 2, as is well known in the microwave art.

The phase locked loop operates by locking the voltage controlled oscillator 254, and therefore the klystron output 256, at the frequency of the input from the power beam reference source 202 to the mixer 242 and at the proper phase angle. This is accomplished by integrating a phase error signal to adjust the output frequency of the voltage controlled oscillator until the phase error at the output of the digital summation junction 248 goes to and remains zero because, when the phase difference is constant at zero, the klystron frequency and phase and the frequency and phase of the reference source 202 are respectively identical. The loop phase-dependent signal is input to the digital summation junction 248 from the analog to digital converter 246 and also the phase compensation angle is input to the junction 248 from the data input circuit 206. The input of a new phase compensation angle will shift the input to the digital control element 250 which in turn will momentarily change the frequency of the voltage controlled oscillator 254 until it again locks in on the input frequency to the mixer 242 but at its new phase angle.

The digital input circuit includes the data input to a summing junction 260 from the demodulation and control circuit 210 and a control signal from the demodulation and control circuit 210 to the update gate 262. An eight bit latch 264 holds the current total phase compensation factor $\phi_{C2}$ as an input to the digital summation junction 248.

When a new phase compensation factor $\Delta\phi_{C2}$ is determined by the instrumentation on earth, data representing this change in phase angle is communicated by the telemetry to the solar power satellite and applied by the demodulation and control circuit to the input 270 to the summing junction 260. A command signal is then given by the demodulation and control circuit 210 to gate the updated total phase angle into the 8 bit latch. Upon momentary actuation of the gate 262, the sum of the present contents of the 8 bit latch 264 and the input $\Delta\phi_{C2}$ is gated into the 8 bit latch and continuously applied to the digital summing junction 248.

FIG. 8 illustrates the circuitry of the instrumentation located at the receiving antenna field on earth. The three receiving antennas a, b and c each receive the waves which are radiated from the radiators 1 and 2 on the solar powered satellite. These waves are applied from the receiving antennas a, b and c to the mixing and filtering means 300.

The mixing and filtering means 300 serves to translate the signals which are derived from the received waves and to detect the desired beat signals. Signals from the waves received at receiving antennas a, b and c are applied respectively to mixers 302, 304 and 306 to translate the signals down to a lower frequency, for example, around a center frequency of 20 MHz. The switches 308 and 310 connected into the output of the mixer 302 are switched to select the first set of sidebands or the second set of sidebands as described above. The upper sideband is recovered by the band pass filter 312 or 314 and is mixed with the carrier from the filter 316 at the mixer 318. These mixed frequencies are filtered by the filter 320 to recover the beat or difference signal of the carrier and upper sideband. Similarly, the lower sideband is selected by the filter 322 or 324 and along with the carrier from the filter 316 is applied to the mixer 325 the output of which is filtered at the filter 328 to recover the beat of the lower sideband with the carrier.

The phase comparator 330 compares the phase of the beat of the upper sideband with the carrier to the phase of the beat of the lower sideband with the carrier and this phase difference is converted to digital form by the analog to digital converter 333 and applied to the digital processor 336. The phase difference is stored in the assigned memory location which is assigned to the first set of sidebands or the second set of sidebands as is appropriate.

The signals from the receiving antennas b and c are translated downwardly by mixers 304 and 306 and applied to filters 340, 342, 344 and 346 to separately recover the carrier and lower sideband for each receiving antenna. These are applied to mixers 346 and 348 and filtered by filters 350 and 352 to provide the beat signal derived from the carrier and lower sideband signals for each receiving antenna b and c. These beat signals represent the travelling wave.

These beat signals representing the travelling wave are applied to phase comparators 354 and 356. Their phase is compared with the corresponding beat signals as received at antenna a. Therefore, the phase comparator 354 compares the phase of the travelling wave as observed at receiving antenna a with the phase of the travelling wave as observed at receiving antenna b. Similarly, the phase comparator 356 compares the phase of the travelling wave as observed at receiving antenna c with the phase of the travelling wave as observed at receiving antenna a. These phase differences are applied to analog to digital converters 358 and 360 and stored in memory locations within the digital processor 336. They are used with the mapping processes described above to calculate the distance d between the radiators 1 and 2 and the angle $\theta_r$ decribed above. The distance d which is computed is then applied and used in the generation of the phase correction factor $\Delta\phi_{C2}$. Alternatively, of course, the measurement and computation of the distance d and $\theta_r$ all may be previously stored in memory if known, for example, from the engineering blueprints, otherwise as described above.

FIG. 9 illustrates the simplified circuit diagram of the solar power satellite circuitry with the power beam frequency used as the lower sideband so that testing and phase compensation can be performed at the power beam frequency. The internal reference carrier source may, for example, be 1 MHz.

The ground instrumentation circuitry will be essentially like that of FIG. 8 with the following changes: The local oscillator may, for example, be 2430 MHz; filters 312 and 314 will be replaced with a single filter which passes the translated upper sideband, e.g., 22 MHz; the filter 316 will still pass the translated carrier frequency, e.g. 21 MHz; the filters 322 and 324 will be replaced with a single filter passing the translated lower sideband, e.g., 20 MHz; the filters 340, 342, 344 and 346 still pass the translated carrier and translated lower sideband; the single pole double throw switches are eliminated as is an assigned memory location connected to the output of the A/D converter 333. There are a variety of other useful applications of travelling wave interferometry and undoubtedly many which cannot be imagined at this time.

Travelling wave interferometry can be useful for airplane landing systems. It is useful for measuring the orientation of a space vehicle during reentry or of a space vehicle or antenna in distant space.

By systematically recording the update data used for phase compensating the solar power satellite it may be determined that the satellite undergoes predictable oscillations. A model analysis of these oscillations may permit a prediction of the needed phase compensation factors. The predicted phase compensation factors could be input at the appropriate times to maintain the approximately accurate tuning of the entire space antenna radiator array. Actual measurements could be done infrequently to update the predicted phase compensation factors.

The travelling wave interferometry phase compensation technique permits the *electrical* pointing or aiming of large array atennas at remote locations, such as distant planets. This would be done by compensating of the individual antennas of the array by assuming the desired virtual antenna.

Travelling wave interferometry permits the measurement of distances between objects both of which are a great distance from the place at which the measurement is made.

BEAM FOCUSING

In the foregoing description of phase compensation in accordance with the present invention, the purpose of the compensation was to form a planar wave front incident upon the receiving antenna site. For that purpose equations I and II indicated the calculation of $\Delta\phi_{C2}$, the phase angle which is the phase compensation factor when the compensation techniques were performed at the power beam frequency $\omega_T$ and at metering frequencies shifted away from the power beam frequency respectively.

The term $$\frac{\omega_T d^2}{2Lc}$$

in these equations represent an adjustment of the phase angles due to the fact that the phase compensation techniques are performed with a single receiving antenna at a single point while the radiated waves were intended to be in phase along a planar wave front. Thus, this term accomplishes the planar wave front after the phase is determined which provides constructive reinforcement at the receiving point a.

If that term is eliminated, that is made equal to 0, the remaining expressions for $\Delta\phi_{C2}$ will give a phase compensation correction factor which causes constructive interference to occur at the point a rather than along a planar wave front.

This focusing of the energy toward the point a is a near field effect dependent upon the radiating antenna being sufficiently close to the receiving antenna that near field effects are not negligible. To be sufficiently close, the distance across the radiating antenna array must not be insignificant with respect to the distance from the receiving antenna to the radiating antenna array.

This focusing by taking advantage of near field effects can be enhanced by making the radiating space antenna considerably larger to increase the focusing effect. In the alternative, the focusing effect may be observed with considerably smaller antennas spaced a considerably smaller distance from a receiving antenna. For example, focusing using travelling wave interferometry techniques may be used in radiation and reception of periodic waves at two points on earth.

Additionally, in accomplishing this near field focusing, there is no need to known the distance d, described above, either from plans or blueprints of the space antenna or from the mapping techniques described above because the term d appears in the term of equation I and II which is eliminated to accomplish focusing.

OFF SITE PHASE COMPENSATION

The transmission of a high energy, microwave beam from a solar power satellite to earth may cause disturbances in the ionosphere or other parts of the transmission media that might modify the transmission characteristics and result in the undesirable phase shifts and distrubances in the waves which are radiated for travelling wave interferometry.

These disturbances in the ionosphere might distort the travelling waves which are generated in accordance with travelling wave interferometry techniques and observed at points a, b and c if these points are in the rectenna field as described above.

To avoid such distortion, the receiving antennas may be constructed away from the site of the energy receiving antenna field at locations a', b' and c' which are for example, about 10 kilometers away. With such off-site reception, the waves radiated from the points on the space antenna to the receiving antennas a', b' and c' will not pass through the disturbed portion of the ionosphere.

The method for accomplishing phase compensation using this off-site technique is accomplished by practicing the phase compensation methods described above to determine a $\Delta\phi_{C2}$ in accordance with the equations I and II and then algebraically adding a further phase shift $\phi_P$ to $\Delta\phi_{C2}$ to determine a total phase compensation factor.

It will be recalled that $\Delta\phi_{C2}$ is a phase compensation factor for correcting each subarray so that a planar wave front will be incident upon the region of the receiving antennas. A phase shift $\phi_P$ is determined for each radiating subarray and the effect of adding it to $\Delta\phi_{C2}$ is to cause the planar wave front to occur at the power-receiving antenna field instead of at the remote points a', b' and c'.

Each radiating subarray is, in sequence, properly phased tuned as described above as if the planar wave front were to arrive about the off-site receiving antenna a'. The wave radiated from each subarray is then phase shifted to cause a cumulative effect of steering the composite beam planar wave front away from the receiving antenna over to the power beam receiving antenna field. Thus, phase compensation is practiced as described above with respect to an off-site receiving antenna a' and then the entire beam is steered, subarray by subarray, to the power receiving antenna field.

Figure 10:
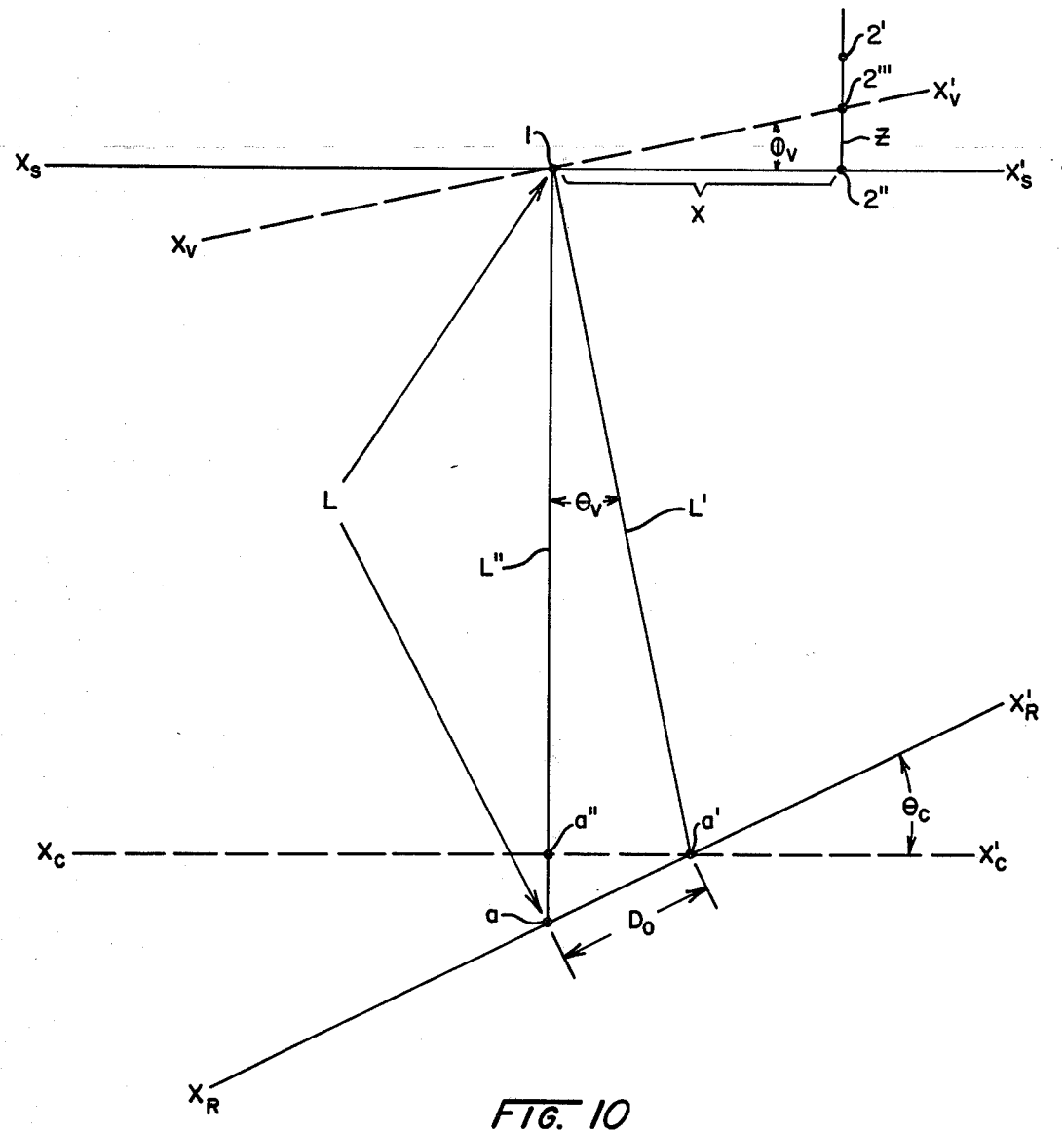
FIG. 10 is a diagram used to aid the understanding of the invention.

This concept may be described in yet another way in terms of the virtual antenna previously referred to. With reference to FIG. 10, the phase compensation factor $\Delta\phi_{C2}$ is determined as previously described to point the virtual antenna at the off-site receiving antenna a' with respect to which the phase compensation techniques of travelling wave interferometry are performed. By introducing a phase shift $\phi_P$ for each subarray, the entire plane of the virtual antenna is pivoted or steered so that the power beam will be incident upon the power receiving antenna field in the form of a planar wave front.

Further modifications of this beam steering technique are possible. For example, it may be desired to steer the beam to various receiving antenna sites which may be constructed at a variety of geographical locations. Thus, for example, the beam can be applied in sequence to a receiving antenna field at two or more major cities for a portion of each day. This may be accomplished by these beam steering techniques.

The determination of the $\phi_P$ is illustrated in connection with FIG. 10. FIG. 10 illustrates many of the corresponding points described previously. For example, the point a in FIG. 10 is the center of the power beam receiving antenna field, the point 1 is the center of the space radiating antenna and the distance L is the distance between these two points.

The point a' represents the position of the off-site receiving antenna used for practicing travelling wave interferometry. Thus, point a' will be the off-site location of the receiving antenna which was located at point a in the other figures.

The sheet of paper of FIG. 10 is in a plane defined by points a, a' and 1. Point 2' represents the projection of the generalized subarray shown as point 2 in the previous figures, onto the plane of the sheet of paper.

Examining FIG. 10 in more detail, the line $X_R$–$X_R'$ is a line connecting points a and a'. The line $X_v$–$X_v'$ is constructed perpendicular to the line L' and extends through the point 1. The line $X_v$–$X_v'$ may be considered an edge view of the plane of the virtual antenna which is pointed at the point a'.

The line $X_s$–$X_s'$ is a line passing through the point 1 and perpendicular to the line joining the point 1 and the point a. It may be considered to represent an edge view of the plane of the virtual antenna when the virtual antenna is pointed at the point a. The line $X_c$–$X_c'$ is a line extending through point a' and parallel to the line $X_s$–$X_s'$.

The point 2" represents the projection of the point 2' onto the line $X_s$–$X_s'$. The point 2''' represents the intersection of the line $X_v$–$X_v'$ and the line extending through the point 2' and the point 2".

The distance $D_O$ represents the distance between the points a and a' and the angle $\theta_c$ represents the angle between the line $X_R$–$X_R'$ and the line $X_c$–$X_c'$.

The distance x is the distance from point 1 to point 2".

The phase shift angle $\phi_P$ for the generalized point 2 is determined from the following equation:

$$\phi_P = \frac{\omega_T D_0 \cos\theta_c}{Lc} x \qquad \text{XIV.}$$

This relationship is dependent upon two important approximations. First, it is assumed that $\theta_c$ is less than approximately 60°. This is reasonable since a greater value of $\theta_c$ would mean a very small angle of incidence of the power beam upon the power beam receiving antenna field which would substantially reduce the energy which could be collected in this manner. The other approximation is that the distances L, L' and L" illustrated in FIG. 10 are approximately equal. The reason is that the distances L, L' and L" are so large with respect to the distances between a, a' and a" that the distances L' and L" may both be approximated by the distance L. This is a reasonable approximation which will give only insignificant error.

Disturbances may occur in the transmission media between the solar power satellite and the off-site receiving antenna. The error resulting from such disturbances and therefore the accuracy of the off-site phase compensation, may be improved by using a multiplicity of off-site locations. Statistical error reduction techniques, such as averaging for example, can then be used to determine the optimum phase correction factor.

As described above, as value $\Delta\phi_{C2}$ and $\phi_p$ is determined for an off-site location. With a multiplicity of off-site locations, a value of $\Delta\phi_{C2}$ and $\phi_p$ is determined for each such location. If there were no disturbances in the transmission path to each off-site location the sum of $\Delta\phi_{C2}$ and $\phi_p$ for each location would all be equal. However, if such sum is different, the different values can be used in conventional statistical error reduction techniques to determine a more accurate value for the proper phase correction and steering of the beam to the power-receiving antenna field. For example, such sums may be averaged.

We claim:

1. A method for use in scientific measurement and analysis and comprising:
    (a) generating travelling interference fringes by radiating at least two different periodic waves at two different frequencies, one from each of two different radiators;
    (b) receiving, mixing and filtering said radiated waves to detect at least one beat signal; and
    (c) detecting the phase of said beat signal relative to a reference signal of the same frequency.

2. A method in accordance with claim 1 further comprising receiving, mixing and filtering said waves at at least one other different receiving antenna to detect a second beat signal and wherein said second beat signal is said reference signal.

3. A method in accordance with claim 1 wherein a third wave is also radiated from one of said radiators and wherein said reference signal is a detected beat signal generated by said third wave and the other wave from the same radiator.

4. A method for creating a moving interference fringe pattern and providing a signal which is related to the distance between the fringes, the method comprising:
    (a) radiating two periodic waves at two different frequencies, one from one radiator and the other from another radiator;
    (b) receiving both of said waves at each of at least two spaced apart receiving antennas;
    (c) mixing and filtering the signals which are generated by both of said waves at each of said receiving antennas to detect a beat of said signals; and
    (d) detecting the phase difference of each of said beats.

5. A method for creating a moving interference fringe pattern and for providing a signal which is related to the position of said fringes relative to a receiving antenna, the method comprising:
    (a) radiating a carrier wave and a sideband wave from a first radiator;
    (b) radiating the opposite sideband wave from a second radiator;
    (c) receiving, mixing and filtering signals generated by said waves at a receiving antenna to detect a beat of the carrier with each of its sidebands; and
    (d) detecting the phase difference of said beats.

6. A method in accordance with claim 5 wherein the steps of claim 2 are repeated for a different pair of sidebands.

7. A method in accordance with claim 5 for also providing a signal related to the distance between said fringes, said method further comprising:
    (a) receiving, mixing and filtering signals generated by said waves at a second receiving antenna to detect a beat of said opposite sideband with the signal generated by one of the other waves; and
    (b) detecting the phase difference between the beat of said opposite sideband and said one of the other waves as detected for the waves received at each of said antennas.

8. A method in accordance with claim 7 further comprising the steps of:
    (a) receiving, mixing and filtering signals generated by said waves at a third receiving antenna positioned non-colinear with said first two receiving antennas to detect the beat of said opposite sideband with the signal generated by said one of the other of said waves; and
    (b) detecting the phase difference between the beat of said opposite sideband and said one of said other waves as detected at said third receiving antenna with the corresponding beat as received at said first receiving antenna.

9. A method for generating an electrical signal for use in making a geometrical measurement, said method comprising:
    (a) radiating a first sinusoidally varying wave from a first radiator at a first frequency;
    (b) radiating a second, sinusoidally varying wave from a second radiator at a second frequency which is different than said first frequency;
    (c) receiving both of said waves at each of at least two spaced apart receiving antennas spaced from said first and second radiators;
    (d) mixing and filtering the two signals which are generated by said waves arriving at each antenna to produce a beat signal for each of said antennas; and
    (e) detecting the phase difference between said beat signals.

10. A method in accordance with claim 9 wherein said waves are electromagnetic waves.

11. A method in accordance with claim 9 wherein said waves are received at three receiving antennas.

12. A method for generating an electrical signal for use in metering the distance between two points in space, said method comprising:
    (a) radiating a first, electromagnetic, sinusoidally varying, wave at a first frequency from a first radiator located at one of said points;
    (b) radiating a second electromagnetic, sinusoidally varying wave from a second radiator located at the other of said points at a frequency which is different than said first frequency;

(c) receiving both of said waves at each of at least two spaced apart receiving antennas spaced from said points;
(d) mixing the two signals from each of said antennas which are generated by said waves to produce a beat signal for each of said antennas; and
(e) detecting the phase difference between said beat signal.

13. A method in accordance with claim 12 for metering the distance between said two points comprising the further steps of:
   (a) detecting the frequency of one of said radiated signals; and
   (b) detecting the frequency difference between said radiated signals.

14. A method in accordance with claim 12 comprising:
   (a) receiving said waves at a third antenna which is not colinear with said first two antennas;
   (b) detecting the phase difference between said beats derived from said radiated waves at said third antenna;
   (c) electronically storing data in an electronic computer representing the following parameters:
      $D_{ab}$ = the distance from a first one of said antennas to a second one of said antennas;
      $D_{ac}$ = the distance from said first antenna to the third one of said antennas;
      $\theta_o$ = the angle at said first antenna between said second and said third antennas;
      $\theta_1$ = the angle between a line joining said first antenna and said second antenna and the line of intersection between the plane of said antennas and a plane through said first antenna and perpendicular to a line joining said first antenna and said first point in space;
      $\omega_2$ = the radian frequency of the wave from the second of said points in space;
      $\Delta\omega$ = the difference in radian frequency between the waves from said points in space;
      L = the distance from a first one of said points in space to a first one of said receiving antennas;
      c = the velocity of light;
      $\eta$ = the angle from the zenith of said first receiving antenna relative to the plane of said receiving antennas to said first radiator as observed at said first receiving antenna; and
   (d) machine computing the distance d, between said two points in space and $\theta_r$, the observed orientation of said points, by solving the simultaneous equations:

$$d\cos\theta_r = \frac{\Delta\phi_{ab} - b_1}{a_1}\sin(\theta_1 + \theta_0) - \frac{\Delta\phi_{ac} - b_2}{a_2}\sin\theta_1$$

$$d\sin\theta_r = \frac{\frac{\Delta\phi_{ab} - b_1}{a_1}\cos(\theta_1 + \theta_0) - \frac{\Delta\phi_{ac} - b_2}{a_2}\cos\theta_1}{\cos\eta}$$

wherein: $a_1 = \frac{\omega_2 D_{ab}}{Lc}$  $b_1 = \frac{\Delta\omega D_{ab}^2}{2Lc} - \frac{\Delta\omega}{c} D_{ab}\sin\theta_1\sin\eta$ $a_2 = \frac{2D_{ac}}{Lc}$  $b_2 = \frac{\Delta\omega D_{ac}^2}{2Lc} - \frac{\Delta\omega}{c} D_{ac}\sin(\theta_1 + \theta_0)\sin\eta$ and wherein $\Delta\phi_{ab}$ is the total phase difference between the beats described at said first and said second antennas and $\Delta\phi_{ac}$ is the total phase difference between the beats detected at said first and said third antennas, and wherein $$\Delta\phi_{ab} = \phi_{ab} + m2\pi$$

$$\Delta\phi_{ac} = \phi_{ac} + n2\pi$$

wherein $\phi_{ab}$ and $\phi_{ac}$ are the *measured* values of the above phase shifts respectively.

15. A method in accordance with claim 14 further comprising positioning said first antenna at the apex of a right angle and the others of said antennas on lines forming said right angle.

16. A method in accordance with claim 15 further comprising positioning said other antennas equidistant from said first antenna.

17. A method for generating an electrical signal for compensating the phase of sinusoidally varying waves at the same frequency $\omega_T$ from two points so that they will be in phase along a substantially planar wave front at a receiving location, said method comprising:
   (a) radiating a first, sinusoidally varying reference wave from a first one of said points at a first frequency;
   (b) radiating a second, sinusoidally varying reference wave from said first point at a second, different frequency;
   (c) radiating a third sinusoidally varying wave from said second point at a frequency which is different from the frequency of said two waves from said first point;
   (d) receiving, mixing and filtering said reference waves at a location on earth to produce a reference beat signal;
   (e) receiving, mixing and filtering one of said reference waves and said wave from said second point at said location on earth to produce a second beat signal; and
   (f) detecting the phase difference between said beat signals.

18. A method in accordance with claim 17 wherein one of said reference signals and said signal from said second point are sidebands which are equally spaced on opposite sides of the other of said reference signals.

19. A method in accordance with claim 18 wherein said waves are electromagnetic waves.

20. A method in accordance with claim 19 wherein the lower of said sidebands is $\omega_T$ and wherein the method further comprises the steps of:
   (a) electronically storing data in an electronic computer representing the following parameters:
      said $\omega_T$
      d = the distance between said points;
      L = the distance from a first one of said points in space to a first one of said receiving antennas;
      c = the velocity of light; and
   (b) machine computing the phase correction angle $\Delta\phi_{C2}$ from the following equation:

$$\Delta\phi_{C2} = \Delta\phi_{ar} - \frac{\omega_T d^2}{2Lc}$$

wherein $\Delta\phi_{ar}$ is said phase difference.

21. A method in accordance with claim 19 wherein all of said steps of claim 19 are repeated for a different pair of sidebands which are equally spaced on opposite sides of said other reference signal.

22. A method in accordance with claim 21 wherein said method further comprises:
(a) electronically storing data in an electronic computer representing the following parameters:
said $\omega_T$
$d$ = the distance between said points;
$L$ = the distance from a first one of said points in space to a first one of said receiving antennas;
$c$ = the velocity of light;
$\omega_m$ = the radian frequency of the wave radiated from said second point during radiation of the first pair of said sidebands;
$\omega_n$ = the radian frequency of the wave radiated from said second point during radiation of said different pair of sidebands; and
(b) machine computing the phase correction angle $\Delta\phi_{C2}$ from the following equation:

$$\Delta\phi_{C2} = \frac{(\omega_T - \omega_n)\phi_m - (\omega_T - \omega_m)\phi_n}{\omega_m - \omega_n} - \frac{\omega_T d^2}{2Lc}$$

wherein $\phi_n$ is said phase difference between said beat signals for radiation of said second pair of sidebands and wherein $\phi_m$ is said detected phase difference $\phi_m$ between said beat signals for radiation of said first pair of sidebands if the absolute value of said detected phase difference $\phi_m$ less $\phi_n$ is less than $\pi$ and wherein otherwise $\phi_m$ is $2\pi + \phi_m$ if $\phi_m$ is less than zero and $\phi_m$ is $\phi_m - 2\pi$ is not less than zero.

23. A method in accordance with claim 22 further comprising the steps of:
(a) receiving one of said reference waves and said third wave at each of at least two spaced apart receiving antennas spaced from said points;
(b) mixing the two signals from each of said receiving antennas which are generated by said one reference wave and said third wave to produce a beat signal for each of said antennas; and
(c) detecting the phase difference between said beat signals.

24. A method in accordance with claim 23 comprising:
(a) receiving said waves at three antennas which are not colinear;
(b) electronically storing data in an electronic computer representing the following parameters:
$D_{ab}$ = the distance from a first one of said antennas to a second one of said antennas;
$D_{ac}$ = the distance from said first antenna to the third one of said antennas;
$\theta_0$ = the angle at said first antenna between said second and said third antennas;
$\theta_1$ = the angle between a line joining said first antenna and said second antenna and the line of intersection between the plane of said antennas and a plane through said first antenna and perpendicular to a line joining said first antenna and said first point in space;
$\omega_2$ = the radian frequency of the wave from the second of said points in space;
$\Delta\omega$ = the difference in radian frequency between the waves from said points in space;
$L$ = the distance from a first one of said points in space to a first one of said receiving antennas;
$c$ = the velocity of light;
$\eta$ = the angle from the zenith of said first receiving antenna relative to the plane of the receiving antennas to said first radiator as observed at said first receiving antenna; and
(c) machine computing the distance, $d$, between said two points in space and $\theta_r$, the observed orientation of said points, by solving the simultaneous equations:

$$d\cos\theta_r = \frac{\Delta\phi_{ab} - b_1}{a_1}\sin(\theta_1 + \theta_0) - \frac{\Delta\phi_{ac} - b_2}{a_2}\sin\theta_1$$

$$d\sin\theta_r = \frac{\frac{\Delta\phi_{ab} - b_1}{a_1}\cos(\theta_1 + \theta_0) - \frac{\Delta\phi_{ac} - b_2}{a_2}\cos\theta_1}{\cos\eta}$$

wherein: $a_1 = \frac{\omega_2 D_{ab}}{Lc}$ $b_1 = \frac{\Delta\omega D_{ab}^2}{2Lc} - \frac{\Delta\omega}{c} D_{ab}\sin\theta_1\sin\eta$ $a_2 = \frac{2D_{ac}}{Lc}$ $b_2 = \frac{\Delta\omega D_{ac}^2}{2Lc} - \frac{\Delta\omega}{c} D_{ac}\sin(\theta_1 + \theta_0)\sin\eta$ and wherein $\Delta\phi_{ab}$ is the total phase difference between the beats detected at said first and said second antennas and $\Delta\phi_{ac}$ is the total phase difference between the beats detected at said first and said third antennas. and wherein $$\Delta\phi_{ab} = \phi_{ab} + m2\pi$$

$$\Delta\phi_{ac} = \phi_{ac} + n2\pi$$

wherein $\phi_{ab}$ and $\phi_{ac}$ are the measured values of the above phase shifts respectively.

25. A method in accordance with claim 24 for also aiming and phasing an array of more than three radiating antennas comprising:
(a) radiating said reference waves from a selected reference antenna in said array;
(b) performing the steps of claim 21 to determine a $\Delta\phi_{C2}$ for a selected reference antenna and each of the other antennas in sequence, one at a time; and
(c) sequentially correcting the phase of each of said other antennas by its phase correction $\Delta\phi_{C2}$ to bring it into the proper phase relative to said selected reference antenna.

26. An apparatus for use in making a geometrical measurement relative to two spaced points, said apparatus comprising:
(a) a first radiator and signal generating means connected thereto for radiating a first periodic wave from a first one of said points at a first frequency;
(b) a second, radiator and signal generating means connected thereto for radiating a second, periodic wave from the second one of said points at a second frequency spaced from said first frequency;
(c) a first receiving antenna spaced from both of said radiators for receiving said waves;
(d) a second receiving antenna spaced from both of said radiators and from said first receiving antenna for receiving said waves;
(e) mixing and filtering means connected to said first and to second receiving antennas for detecting the beat signals of said waves as received at each of said receiving antennas; and
(f) phase detecting means for detecting the phase difference between each of said beat signals.

27. An apparatus in accordance with claim 26 wherein said waves are electromagnetic waves.

28. An apparatus in accordance with claim 26 wherein there is further included:
 (a) a third receiving antenna spaced from both of said radiators and spaced from and not colinear with said first and second receiving antennas;
 (b) electronic data storage means connected to the output of said phase detecting means for storing data representing at least all but one of the following parameters:
  $D_{ab}$ = the distance from a first one of said antennas to a second one of said antennas;
  $D_{ac}$ = the distance from said first antenna to the third one of said antennas;
  $\theta_o$ = the angle at said first antenna between said second and said third antennas;
  $\theta_1$ = the angle between a line joining said first antenna and said second antenna and the line of intersection between the plane of said antennas and a plane through said first antenna and perpendicular to a line joining said first antenna and said first point in space;
  $\omega_2$ = the radian frequency of the wave from the second of said points in space;
  $\Delta\omega$ = the difference in radian frequency between the waves from said points in space;
  L = the distance from a first one of said points in space to a first one of said receiving antennas;
  c = the velocity of light;
  $\eta$ = the angle from the zenith of said first receiving antenna relative to the plane of said receiving antennas to said first radiator as observed at said first receiving antenna; and
 (c) machine computing means connected to said data storage means for solving at least one of the following simultaneous equations for at least one of said parameters:

$$d\cos\theta_r = \frac{\Delta\phi_{ab} - b_1}{a_1}\sin(\theta_1 + \theta_0) - \frac{\Delta\phi_{ac} - b_2}{a_2}\sin\theta_1$$

$$d\sin\theta_r = \frac{\frac{\Delta\phi_{ab} - b_1}{a_1}\cos(\theta_1 + \theta_0) - \frac{\Delta\phi_{ac} - b_2}{a_2}\cos\theta_1}{\cos\eta}$$

wherein: $a_1 = \frac{\omega_2 D_{ab}}{Lc}$  $b_1 = \frac{\Delta\omega D_{ab}^2}{2Lc} - \frac{\Delta\omega}{c} D_{ab}\sin\theta_1\sin\eta$ $a_2 = \frac{2D_{ac}}{Lc}$  $b_2 = \frac{\Delta\omega D_{ac}^2}{2Lc} - \frac{\Delta\omega}{c} D_{ac}\sin(\theta_1 + \theta_0)\sin\eta$ wherein:
 d = the distance between said two points and
 $\theta_r$ = the observed orientation of said points;
 and wherein $\Delta\phi_{ab}$ is the total phase difference between the beats detected at said first and said second antennas and $\Delta\phi_{ac}$ is the total phase difference between the beats detected at said first and said third antennas. and wherein $\Delta\phi_{ab} = \phi_{ab} + m2\pi$ $\Delta\phi_{ac} = \phi_{ac} + n2\pi$ wherein $\phi_{ab}$ and $\phi_{ac}$ are the *measured* values of the above phase shifts respectively.

29. An apparatus in accordance with claim 28 wherein said first antenna is positioned at the apex of a right angle and the other of said antennas lie on lines forming said right angle and are equidistant from said first antenna.

30. An apparatus for use in adjusting an array of at least two transmitting antennas to make waves radiated from them at an operating frequency arrive in phase at a receiving antenna means, said apparatus comprising:
 (a) means for radiating a first periodic reference wave from a first one of said transmitting antennas;
 (b) means for radiating a second, periodic reference wave from said first radiating antenna at a sideband frequency spaced from the frequency of said first reference wave;
 (c) means for radiating a third periodic wave from the second one of said transmitting antennas at a second sideband frequency spaced on the opposite side of said second reference wave by a frequency band equal to the spacing of the frequency of said first reference wave from said second reference wave;
 (d) a receiving antenna spaced from said transmitting antennas for receiving all of said waves;
 (e) mixing and filtering means coupled to said receiving antenna for detecting the beat signal derived from said first reference wave and said second reference wave to provide a reference beat signal and for detecting the beat signal derived from said second reference wave and said third wave; and
 (f) phase detecting means for detecting the phase difference between said beat signals.

31. An apparatus in accordance with claim 30 wherein said waves are electromagnetic.

32. A apparatus in accordance with claim 31 wherein the lower of said sidebands is $\omega_T$ and wherein the method further comprises the steps of:
 (a) electronically showing data in an electronic computer representing the following parameters:
  said $\omega_T$
  d = the distance between said points;
  L = the distance from a first one of said points in space to a first one of said receiving antennas;
  c = the velocity of light; and
 (b) machine computing the phase correction angle $\Delta\phi_{c2}$ from the following equation:

$$\Delta\phi_{C2} = \Delta\phi_{ar} - \frac{\omega_T d^2}{2Lc}$$

wherein $\Delta\phi_{ar}$ is said phase difference.

33. An apparatus in accordance with claim 32 wherein there is further included:
 (a) means for radiating a different pair of sideband frequencies from said transmitting antennas;
 (b) electronic data storage means connected to the output of said phase detecting means for storing the following parameters:
  said $\omega_T$
  d = the distance between said points;
  L = the distance from a first one of said points in space to a first one of said receiving antennas;
  c = the velocity of light;
  $\omega_m$ = the radian frequency of the wave radiated from said second point during radiation of the first pair of said sidebands;
  $\omega_n$ = the radian frequency of the wave radiated from said second point during radiation of said different pair of sidebands; and (c) machine computing means connected to said data storage means for solving the following equation:

$$\Delta\phi_{C2} = \frac{(\omega_T - \omega_n)\phi_m - (\omega_T - \omega_m)\phi_n}{\omega_m - \omega_n} - \frac{\omega_T d^2}{2Lc}$$

wherein $\phi_n$ is said phase difference between said beat signals for radiation of said different pair of sidebands and wherein $\phi_m$ is said detected phase difference $\phi_m$ between said beat signals for radiation of said first pair of sidebands if the absolute value of said detected phase difference $\phi_m$ less $\phi_n$ is less than $\pi$ and otherwise $\phi_m$ is $2\pi + \phi_m$ if $\phi_m$ is less than zero and $\phi_m$ is $\phi_m - 2\pi$ if $\phi_m$ is not less than zero.

34. An apparatus in accordance with claim 32 or 33 wherein there is further provided:
(a) a second receiving antenna spaced from said first receiving antenna;
(b) a third receiving antenna spaced from and not colinear with said first and said second receiving antennas;
(c) mixing and filtering means connected to each of said receiving antennas for detecting the beat signals derived from the beat of one of said reference waves and said third wave as received at each of said receiving antennas; and
(d) phase detecting means for detecting the phase difference between said beat signals.

35. A method for phase compensating sinusoidally varying waves at the same frequency, $\omega_T$, from at least two points so that they will be substantially focused to constructively reinforce at a single point at a receiving location, said method comprising:
(a) Radiating a first, sinusoidally varying reference wave at a frequency different from $\omega_T$ from a reference point;
(b) Radiating a second sinusoidally varying reference wave from said reference point at a second frequency which is different from $\omega_T$ and from said first wave;
(c) Radiating a third sinusoidally varying wave from one of said two points at a frequency of $\omega_T$;
(d) Receiving, mixing and filtering said reference waves at a location on earth to produce a reference beat signal;
(e) Receiving, mixing and filtering one of said reference waves and said wave from one of said two points at said location on earth to produce a second beat signal;
(f) Detecting the phase difference between said beat signals;
(g) Shifting the phase of the third sinusoidally varying wave by a phase angle equal to said detected phase difference between said beat signals so that the phase difference between said beat signals will become zero; and
(h) Repeating steps (c) through (g) for a wave radiated at a frequency $\omega_T$ from the second one of said two points.

36. A method in accordance with claim 35 wherein said waves are electromagnetic waves.

37. A method in accordance with claim 35 wherein one of said reference waves and $\omega_T$ are sidebands which are equally spaced on opposite sides of the other said reference signals.

38. A method in accordance with claim 36 wherein all said steps of claim 37 are repeated for a different pair of sidebands which are equally spaced on opposite sides of said other reference signal.

39. A method for steering a beam of radiated waves which is radiated from a plurality of spaced subarray radiators forming a radiating antenna field, from incidence upon a first point with a planar wave front to incidence upon a second point with a planar wave front, said method comprising: shifting the wave radiated from each subarray radiator by a phase shift $\phi_P$ for each subarray radiator defined by the expression:

$$\phi_P = \frac{\omega_T D_0 \cos\theta_c}{Lc} x$$

wherein $D_O$ represents the distance between said points of incidence, $\omega_T$ represents the frequency of the radiated waves, x represents the distance from a selected one of said subarray radiators to a point which results from the projection of the position of the subarray radiator having the phase of its radiated wave being shifted, onto the plane defined by said first point, said second point and said selected subarray and then projection onto the plane passing through said selected subarray perpendicularly to a line joining said selected subarray and said second point, $\theta_c$ represents the angle between a line joining said first point of incidence with said second point of incidence and a line passing through said first point of incidence and perpendicular to a line joining said second point of incidence and one of said radiators, L represents the distance from said second point of incidence to said one radiator, and c is the speed of light.

40. A method in accordance with claim 20 for additionally avoiding transmission path disturbances by using off-site phase compensation and steering said beam to a second point of incidence, said method further comprising:
(a) performing the steps of claim 20 at a said location which is a first point of incidence on earth spaced a distance $D_o$ from said second point of incidence; and
(b) shifting the wave radiated from each subarray radiator by a phase shift $\phi_P$ for each subarray radiator defined by the expression:

$$\phi_P = \frac{\omega_T D_0 \cos\theta_c}{Lc} x$$

wherein $\omega_T$ represents the frequency of the radiated waves, x represents the distance from a selected one of said subarray radiators to a point which results from the projection of the position of the subarray radiator having the phase of its radiated wave being shifted, onto the plane defined by said first point, said second point and said selected subarray and then projection onto the plane passing through said selected subarray perpendicularly to a line joining said selected subarray and said second point, $\phi_c$ represents the angle between a line joining said first point of incidence with said second point of incidence and a line passing through said first point of incidence and perpendicular to a line joining said secondpoint of incidence and one of said radiators, L represents the distance from said second point of incidence to said one radiator, and c is the speed of light.

41. A method in accordance with claim 40 further comprising the steps of performing the steps of claim 40 in sequence for each of a multiplicity of different locations on earth and determining a corresponding multiplicity of phase correction factors $\Delta\phi_{C2}$ and phase shifts $\phi_P$ for each of said locations and then using conventional statistical error reduction techniques for determining a total, optimum phase compensation factor.

42. A method in accordance with claim 22 for additionally avoiding transmission path disturbances by using off-site phase compensation and steering said beam to a second point of incidence, said method further comprising:
 (a) performing the steps of claim 22 at a said location which is a first point of incidence on earth spaced a distance $D_o$ from said second point of incidence; and
 (b) shifting the wave radiated from each subarray radiator by a phase shift $\phi_P$ for each subarray radiator defined by the expression:

$$\phi_P = \frac{\omega_T D_0 \cos\theta_c}{Lc} x$$

wherein $\omega_T$ represents the frequency of the radiated waves, x represents the distance from a selected one of said subarray radiators to a point which results from the projection of the position of the subarray radiator having the phase of its radiated wave being shifted, onto the plane defined by said first point, said second point and said selected subarray and then projection onto the plane passing through said selected subarray perpendicularly to a line joining said selected subarray and said second point, $\phi_c$ represents the angle between a line joining said first point of incidence with said second point of incidence and a line passing through said first point of incidence and perpendicular to a line joining said second point of incidence and one of said radiators, L represents the distance from said second point of incidence to said one radiator, and c is the speed of light.

43. A method in accordance with claim 42 further comprising the steps of performing the steps of claim 42 in sequence for each of a multiplicity of different locations on earth and determining a corresponding multiplicity of phase correction factors $\Delta\phi_{C2}$ and phase shifts $\phi_P$ for each of said locations and then using conventional statistical error reduction techniques for determining a total, optimum phase compensation factor.

44. A method for phase adjusting the subarray radiators of an antenna array while the array is radiating at a primary operating frequency, said method comprising:
 (a) radiating a wave from a subarray radiator at a frequency which is spaced from said primary operating frequency;
 (b) comparing the phase of said wave to the phase of a reference signal at the same frequency as a signal derived from said wave to determine the phase difference;
 (c) calculating a phase compensation angle for said subarray which will bring the radiation from said subarray into a selected phase relationship with the radiation from said array at said operating frequency;
 (d) adjusting the phase of said subarray by said phase compensation angle; and
 (e) repeating said steps (a) through (d), in sequence, for others of said radiators.

* * * * *